United States Patent
Loiseleur et al.

(10) Patent No.: US 12,527,322 B2
(45) Date of Patent: Jan. 20, 2026

(54) FUNGICIDAL COMPOSITIONS

(71) Applicant: SYNGENTA CROP PROTECTION AG, Basel (CH)

(72) Inventors: Olivier Loiseleur, Stein (CH); Hanno Christian Wolf, Stein (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 504 days.

(21) Appl. No.: 18/000,605

(22) PCT Filed: Jun. 1, 2021

(86) PCT No.: PCT/EP2021/064717
§ 371 (c)(1),
(2) Date: Dec. 2, 2022

(87) PCT Pub. No.: WO2021/245106
PCT Pub. Date: Dec. 9, 2021

(65) Prior Publication Data
US 2023/0210114 A1    Jul. 6, 2023

(30) Foreign Application Priority Data

Jun. 4, 2020 (EP) .................................. 20178373

(51) Int. Cl.
*A01N 37/46* (2006.01)
*A01P 3/00* (2006.01)

(52) U.S. Cl.
CPC ............... *A01N 37/46* (2013.01); *A01P 3/00* (2021.08)

(58) Field of Classification Search
CPC ................................ A61N 37/46; A01N 37/46
See application file for complete search history.

(56) References Cited

U.S. PATENT DOCUMENTS

2014/0155321 A1    6/2014   O'Neil et al.

FOREIGN PATENT DOCUMENTS

| CN | 104428036 A | 3/2015 | |
| EP | 0500264 A1 | 8/1992 | |
| WO | WO-2018097126 A1 * | 5/2018 | ............. A01N 47/44 |
| WO | 2018102345 A1 | 6/2018 | |
| WO | 2020018888 A1 | 1/2020 | |

OTHER PUBLICATIONS

J Org Chem, 1994, 59, 570-578 (Year: 2002).*
EPO; App. No. EP20178373.5; Extended European Search Report dated Oct. 30, 2022; pp. 1-10.
Liu et al.; "In vitro inhibition of postharvest pathogens of fruit and control of gray mold of strawberry and green mold of citrus by aureobasidin A"; International Journal of Food Microbiology, Elsevier BV, NL; vol. 119, No. 3; Nov. 1, 2007; pp. 223-229.
Mattes et al.; "Advancement of Natural Products: Optimization of Instrumentation and Examples of Their Application to the Isolation of New Compounds"; University Of Oklahoma Graduate College; Jan. 1, 2019; pp. 1-180.
WIPO; App. No. PCT/EP2021/064717; International Search Report and Written Opinion dated Aug. 31, 2021; pp. 1-17.
Wuts et al.; "Generation of Broad-Spectrum Antifungal Drug Candidates from the Natural Product Compound Aureobasidin A", ACS Medicinal Chemistry Letters; vol. 6, No. 6; Apr. 23, 2015; pp. 645-649.
Kurome Toru et al.; "Structure-activity relationship of antifungal aureobasidin A, inhibitor of sphingolipid biosynthesis: Synthesis of new active aureobasidins against Aspergillus fumigatus"; Peptide Science, Protein Research Foundation, Minoo, JP, vol. 36, Jan. 1, 1999, pp. 197-200.

* cited by examiner

*Primary Examiner* — Benjamin J Packard
(74) *Attorney, Agent, or Firm* — BakerHostetler; Toni-Junell Herbert

(57) ABSTRACT

A fungicidal composition comprising a mixture of components (A) and (B), wherein components (A) and (B) are as defined in claim 1, and use of the compositions in agriculture or horticulture for controlling or preventing infestation of plants by phytopathogenic microorganisms, preferably fungi.

18 Claims, No Drawings

FUNGICIDAL COMPOSITIONS

CROSS-REFERENCE TO RELATED APPLICATIONS

This application is a 371 National Stage Application of International Application No. PCT/EP2021/064717, filed Jun. 1, 2021, which claims priority to EP 20178373.5, filed Jun. 4, 2020, the entire contents of which are incorporated by reference herein.

The present invention relates to novel fungicidal compositions for the treatment of phytopathogenic diseases of useful plants, especially phytopathogenic fungi, and to a method of controlling such diseases, and/or fungi, on useful plants.

Whilst many fungicidal compounds, belonging to various different chemical classes, have been/are being developed for use as fungicides in crops of useful plants, crop tolerance and activity against particular phytopathogenic fungi do not always satisfy the needs of agricultural practice in many respects. WO 2018/102345 discloses use of Aureobasidin A as an agricultural fungicide to treat, prevent or control fungal infections in plants and seeds. Aureobasidin A is an antifungal cyclic depsipeptide antibiotic produced by *Aureobasidium pullulans*. See, for instance, Takesako et al., *The Journal of Antibiotics*, 1991, 44, 919-924.

However, there is a continuing need to find new compositions having superior biological properties for use in controlling or preventing infestation of plants by phytopathogenic fungi. For example, compositions possessing a broader spectrum of activity, improved crop tolerance, synergistic interactions or potentiating properties, or compositions which display a more rapid onset of action or which have longer lasting residual activity or which enable a reduction in the number of applications and/or a reduction in the application rate of the compounds and compositions required for effective control of a phytopathogen, thereby enabling beneficial resistance-management practices, reduced environmental impact and reduced operator exposure.

The use of compositions comprising mixtures of different fungicidal compounds possessing different modes of action can address some of these needs (eg, by combining fungicides with differing spectrums of activity).

According to the present invention, there is provided a fungicidal composition comprising a mixture of components (A) and (B) as active ingredients, wherein component (A) is a cyclic depsipeptide of formula (I) or a stereoisomer thereof:

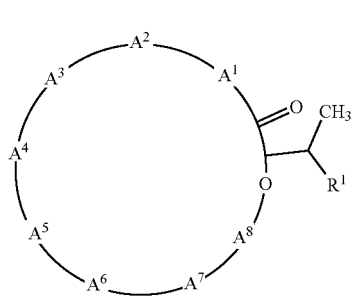

(I)

wherein
$R^1$ is methyl, ethyl, 1-hydroxyethyl or 2-hydroxyethyl;
$A^1$ is an α-aminoacid residue selected from the group consisting of of N-methyl-L-valine (L-MeVal) and L-valine (L-Val) residues;
$A^2$ is an α-amino acid residue selected from the group consisting of L-phenylalanine (L-Phe), ortho-fluoro-L-phenylalanine (L-o-FPhe), meta-fluoro-L-phenylalanine (L-m-FPhe), L-tyrosine (L-Tyr), L-cyclohexylalanine (L-Cha), O-acetyl-L-tyrosine [L-Tyr(Ac)], O-n-hexanoyl-L-tyrosine [L-Tyr(n-hexanoyl)], O-benzoyl-L-tyrosine [L-Tyr(Bzl)] and persephanine residues;
$A^3$ is an α-amino acid residue selected from the group consisting of N-methyl-L-phenylalanine (L-MePhe), L-phenylalanine (L-Phe), β-hydroxy-N-methyl-L-phenylalanine (L-β-OH-MePhe), ortho-fluoro-N-methyl-L-phenylalanine (L-o-F-MePhe), meta-fluoro-N-methyl-L-phenylalanine (L-m-F-MePhe), para-fluoro-N-methyl-L-phenylalanine (L-p-F-MePhe), meta-bromo-N-methyl-L-phenylalanine (L-m-Br-MePhe), para-bromo-N-methyl-L-phenylalanine (L-p-Br-MePhe), meta-iodo-N-methyl-L-phenylalanine (L-m-I-MePhe), para-iodo-N-methyl-L-phenylalanine (L-p-I-MePhe), 3-phenyl-N-methyl-L-phenylalanine, 4-phenyl-N-methyl-L-phenylalanine, 3-(4-fluorophenyl)-N-methyl-L-phenylalanine, 4-(4-fluorophenyl)-N-methyl-L-phenylalanine, 3-(4-pyridinyl)-N-methyl-L-phenylalanine, 4-(4-pyridinyl)-N-methyl-L-phenylalanine, 3-(1-pyridinyl)-N-methyl-L-phenylalanine, 4-(1-pyridinyl)-N-methyl-L-phenylalanine, 4-(2-chloro-4-pyridinyl)-N-methyl-L-phenylalanine, 3-(2-chloro-5-pyridinyl)-N-methyl-L-phenylalanine, 4-(2-chloro-5-pyridinyl)-N-methyl-L-phenylalanine, 3-[4-(piperazin-1-yl)phenyl]phenyl-N-methyl-L-phenylalanine, 4-[4-(piperazin-1-yl)phen-1-yl]phenyl-N-methyl-L-phenylalanine,3-[4-(4-methylpiperazin-1-yl)phenyl]phenyl-N-methyl-L-phenylalanine, 4-[4-(4-methylpiperazin-1-yl)phen-1-yl]phenyl-N-methyl-L-phenylalanine, β-oxo-N-methyl-L-phenylalanine (L-β-oxo-MePhe), β-acetoxy-N-methyl-L-phenylalanine (L-β-AcO-MePhe), N-methyl-L-tyrosine (L-MeTyr), O-methyl-N-methyl-L-tyrosine [L-MeTyr(Me)], N-methyl-L-alanine (L-MeAla), N-methyl-L-serine (L-MeSer), N-methyl-D-phenylalanine (D-MePhe), N-methyl-D-alanine (D-MeAla), N-methyl-D-valine (D-MeVal), N-methyl-D-serine (D-MeSer), N-methyl-sarcosine (MeSar) and N-methyl-L-serine (L-MeSer) residues;
$A^4$ is an α-amino acid residue selected from the group consisting of L-proline (L-Pro), L-thioproline (L-SPro) and 4-hydroxy-L-proline (L-4Hyp) residues;
$A^5$ is an α-amino acid residue selected from the group consisting of L-allo-isoleucine (L-Alle), L-leucine (L-Leu), L-norleucine (L-Nle), L-norvaline (L-Nva) and L-valine (L-Val) residues;
$A^6$ is an α-amino acid residue selected from the group consisting of N-methyl-L-valine (L-MeVal), N-methyl-L-leucine (L-MeLeu), N-methyl-L-allo-isoleucine (L-MeAlle) and L-valine (L-Val) residues;
$A^7$ is an α-amino acid residue selected from the group consisting of L-leucine (L-Leu), L-allo-isoleucine (L-Alle) and L-norvaline (L-Nva) residues; and
$A^8$ is an α-amino acid residue selected from the group consisting of β-hydroxy-N-methyl-L-valine (L-β-OH-MeVal), γ-hydroxy-N-methyl-L-valine (L-γ-OH-MeVal), N-methyl-L-valine (L-MeVal), L-valine (L-Val), N-methyl-2,3-didehydro-L-valine (L-MeDH$_{2,3}$Val), N-methyl-3,4-didehydro-L-valine (L-MeDH$_{3,4}$Val), N-methyl-L-phenylalanine (L-MePhe), β-hydroxy-N- methyl-L-phenylalanine (L-β-OH-MePhe), N-methyl-L-threonine (L-MeThr), sarcosine (Sar) and N,β-dimethyl-L-aspartic acid (L-N,β-MeAsp) residues; and component (B) is selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethyl-benzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline.

In general, the weight ratio of component (A) to component (B) may be from 100:1 to 1:1000, preferably from 100:1 to 1:500, more preferably from 50:1 to 1:200, even more preferably from 50:1 to 1:20.

In some preferred embodiments of the invention, the weight ratio of component (A) to component (B) may be of 1:1, or 1:2, or 1:4, or 1:8, or 2:1, or 4:1, or 8:1, or 16:1, or 20:1, or 1:200, or 1:100, or 1:50, or 1:25, or 1:20, or 1:12.5, or 1:10, or 1:6.2, or 1:5, or 1:2.5.

According to a second aspect of the invention, there is provided a method of controlling or preventing phytopathogenic diseases, especially phytopathogenic fungi, on useful plants or on propagation material thereof, which comprises applying to the useful plants, the locus thereof or propagation material thereof a composition as defined according to the invention. Preferred is a method which comprises applying to the useful plants or to the locus thereof a composition according to the invention, more preferably to the useful plants. Further preferred is a method which comprises applying to the propagation material of the useful plants a composition according to the invention.

According to a third aspect of the invention, there is provided the use of a composition comprising component (A) and component (B) as defined according to the invention as a fungicide.

It has been found that the use of a compound of component (B) and, optionally, component (C) in combination with the compound of formula (I) surprisingly and substantially may enhance the effectiveness of the latter against fungi, and vice versa. Additionally, the use of the compositions of the invention may be effective against a wider spectrum of such fungi than can be combated with the individual active ingredients when used alone.

The benefits provided by certain fungicidal compositions according to the invention may also include, inter alia, advantageous levels of biological activity for protecting plants against diseases that are caused by fungi or superior properties for use as agrochemical active ingredients (for example, greater biological activity, an advantageous spectrum of activity, an increased safety profile, improved physico-chemical properties, or increased biodegradability).

As used herein, the term "cyclic depsipeptide" refers to a cyclic peptide consisting, in sequence, of units derived from a 2-hydroxy-3-methylalkanoic acid and from the α-amino-acids $A^1$, $A^2$, $A^3$, $A^4$, $A^5$, $A^6$, $A^7$ and $A^8$, wherein the α-aminoacid residue $A^8$ is bonded to the —OCH(CH($CH_3$)$R^1$) moiety of the 2-hydroxy-3-methylalkanoic acid through an ester group to form a —C(=O)OCH(CH($CH_3$)$R^1$) moiety, and wherein the α-aminoacid residues $A^1$, $A^2$, $A^3$, $A^4$, $A^5$, $A^6$, $A^7$ and $A^8$ are linked to each other through peptide bonds. The 2-hydroxy-3-methylalkanoic acid can be 2(R)-hydroxy-3(R)-methylpentanoic acid or 2(R)-hydroxy-3-methylbutanoic acid.

In a first embodiment of the invention, component (A) comprises one or more cyclic depsipeptides of formula (I-A):

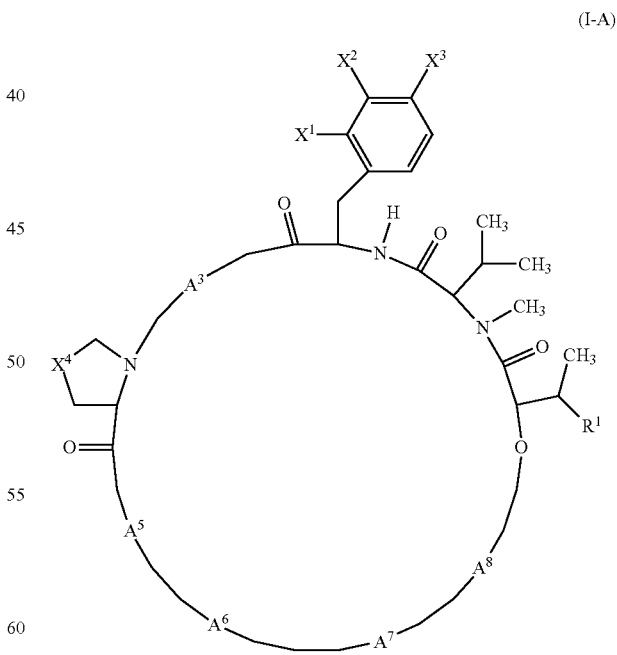

(I-A)

wherein $R^1$ is methyl or ethyl;

each of $X^1$, $X^2$ and $X^3$ is hydrogen, or $X^1$, $X^2$ and $X^3$ are hydrogen, fluorine or hydroxyl, with the proviso that only one of $X^1$, $X^2$ and $X^3$ is fluorine or hydroxyl;

$X^4$ is CH, S or hydroxymethylene;
$A^3$ is an α-amino acid residue selected from the group consisting of N-methyl-L-phenylalanine (L-MePhe), L-phenylalanine (L-Phe), β-hydroxy-N-methyl-L-phenylalanine (L-β-OH-MePhe), ortho-fluoro-N-methyl-L-phenylalanine (L-o-F-MePhe), meta-fluoro-N-methyl-L-phenylalanine (L-m-F-MePhe), para-fluoro-N-methyl-L-phenylalanine (L-p-F-MePhe), meta-bromo-N-methyl-L-phenylalanine (L-m-Br-MePhe), para-bromo-N-methyl-L-phenylalanine (L-p-Br-MePhe), meta-iodo-N-methyl-L-phenylalanine (L-m-I-MePhe), para-iodo-N-methyl-L-phenylalanine (L-p-I-MePhe), 3-phenyl-N-methyl-L-phenylalanine, 4-phenyl-N-methyl-L-phenylalanine, 3-(4-fluorophenyl)-N-methyl-L-phenylalanine, 4-(4-fluorophenyl)-N-methyl-L-phenylalanine, 3-(4-pyridinyl)-N-methyl-L-phenylalanine, 4-(4-pyridinyl)-N-methyl-L-phenylalanine, 3-(1-pyridinyl)-N-methyl-L-phenylalanine, 4-(1-pyridinyl)-N-methyl-L-phenylalanine, 4-(2-chloro-4-pyridinyl)-N-methyl-L-phenylalanine, 3-(2-chloro-5-pyridinyl)-N-methyl-L-phenylalanine, 4-(2-chloro-5-pyridinyl)-N-methyl-L-phenylalanine, 3-[4-(piperazin-1-yl)phenyl]phenyl-N-methyl-L-phenylalanine, 4-[4-(piperazin-1-yl)phen-1-yl]phenyl-N-methyl-L-phenylalanine,3-[4-(4-methylpiperazin-1-yl)phenyl]phenyl-N-methyl-L-phenylalanine, 4-[4-(4-methylpiperazin-1-yl)phen-1-yl]phenyl-N-methyl-L-phenylalanine, β-oxo-N-methyl-L-phenylalanine (L-β-oxo-MePhe), β-acetoxy-N-methyl-L-phenylalanine (L-β-AcO-MePhe), N-methyl-L-tyrosine (L-MeTyr), O-methyl-N-methyl-L-tyrosine [L-MeTyr(Me)], N-methyl-L-alanine (L-MeAla), N-methyl-L-serine (L-MeSer), N-methyl-D-phenylalanine (D-MePhe), N-methyl-D-alanine (D-MeAla), N-methyl-D-valine (D-MeVal), N-methyl-D-serine (D-MeSer) and N-methyl-L-serine (L-MeSer) residues;

$A^5$ is an α-amino acid residue selected from the group consisting of L-allo-isoleucine (L-AIle), L-leucine (L-Leu), L-norleucine (L-Nle), L-norvaline (L-Nva) and L-valine (L-Val) residues;
$A^6$ is an α-amino acid residue selected from the group consisting of N-methyl-L-valine (L-MeVal), N-methyl-L-leucine (L-MeLeu), N-methyl-L-allo-isoleucine (L-MeAIle) and L-valine (L-Val) residues;
$A^7$ is an α-amino acid residue selected from the group consisting of L-leucine (L-Leu), L-allo-isoleucine (L-AIle) and L-norvaline (L-Nva) residues; and
$A^8$ is an α-amino acid residue selected from the group consisting of β-hydroxy-N-methyl-L-valine (L-β-OH-MeVal), γ-hydroxy-N-methyl-L-valine (L-γ-OH-MeVal), N-methyl-L-valine (L-MeVal), L-valine (L-Val), N-methyl-2,3-didehydro-L-valine (L-MeDH$_{2,3}$Val), N-methyl-3,4-didehydro-L-valine (L-MeDH$_{3,4}$Val), N-methyl-L-phenylalanine (L-MePhe), β-hydroxy-N-methyl-L-phenylalanine (L-β-OH-MePhe), N-methyl-L-threonine (L-MeThr), sarcosine (Sar) and N,β-dimethyl-L-aspartic acid (L-N,β-MeAsp) residues.

Preferably, the compound of formula (I) according to the invention is selected from a compound 1.001 to 1.035 listed in Table A (below) or a compound 2.001 to 2.045 listed in Table B (below).

The following lists provides definitions, including preferred definitions, for substituents $R^1$, $A^1$, $A^2$, $A^3$, $A^4$, $A^5$, $A^6$, $A^7$ and $A^8$ with reference to the compounds of formula (I) of the present invention. For any one of these substituents, any of the definitions given below may be combined with any definition of any other substituent given below or elsewhere in this document.

Table A: This table discloses 35 compounds of formula (I), wherein $R^1$, $A^1$, $A^2$, $A^3$, $A^4$, $A^5$, $A^6$, $A^7$ and $A^8$ are as set forth in Table A below:

TABLE A

| No. | $R^1$ | $A^1$ | $A^2$ | $A^3$ | $A^4$ | $A^5$ | $A^6$ | $A^7$ | $A^8$ |
|---|---|---|---|---|---|---|---|---|---|
| 1.001 | Me | L-MeVal | L-Phe | L-MePhe | L-Pro | L-AIle | L-MeVal | L-Leu | L-β-OH-MeVal |
| 1.002 | Me | L-MeVal | L-Phe | L-MePhe | L-Pro | L-AIle | L-MeVal | L-Leu | L-MeVal |
| 1.003 | Me | L-MeVal | L-Phe | L-MePhe | L-Pro | L-Val | L-MeVal | L-Leu | L-MeVal |
| 1.004 | Me | L-MeVal | L-Phe | L-β-OH-MePhe | L-Pro | L-AIle | L-MeVal | L-Leu | L-MeVal |
| 1.005 | Et | L-MeVal | L-Phe | L-MePhe | L-Pro | L-AIle | L-MeVal | L-Leu | L-β-OH-MeVal |
| 1.006 | Et | L-MeVal | L-Phe | L-MePhe | L-Pro | L-Val | L-MeVal | L-Leu | L-β-OH-MeVal |
| 1.007 | Et | L-MeVal | L-Phe | L-MePhe | L-Pro | L-AIle | L-MeVal | L-Leu | L-γ-OH-MeVal |
| 1.008 | Et | L-MeVal | L-Phe | L-β-OH-MePhe | L-Pro | L-AIle | L-MeVal | L-Leu | L-β-OH-MeVal |
| 1.009 | Et | L-MeVal | L-Phe | L-MePhe | L-Pro | L-AIle | L-Val | L-Leu | L-β-OH-MeVal |
| 1.010 | Et | L-MeVal | L-Phe | L-MePhe | L-Pro | L-AIle | L-MeVal | L-Leu | L-MeVal |
| 1.011 | Et | L-MeVal | L-Phe | L-MePhe | L-Pro | L-AIle | L-MeVal | L-Leu | L-Val |
| 1.012 | Et | L-MeVal | L-Phe | L-MePhe | L-Pro | L-Leu | L-MeVal | L-Leu | L-β-OH-MeVal |
| 1.013 | Et | L-MeVal | L-Phe | L-MePhe | L-Pro | L-AIle | L-MeVal | L-Leu | L-N,β-MeAsp |
| 1.014 | Et | L-MeVal | L-Phe | L-MePhe | L-Pro | L-Val | L-MeVal | L-Leu | L-MeVal |
| 1.015 | Et | L-MeVal | L-Phe | L-Phe | L-Pro | L-AIle | L-MeVal | L-Leu | L-MeVal |
| 1.016 | Et | L-MeVal | L-Phe | L-MePhe | L-Pro | L-AIle | L-MeVal | L-Leu | L-MeDH$_{3,4}$Val |
| 1.017 | Et | L-MeVal | L-Phe | L-MePhe | L-Pro | L-AIle | L-MeVal | L-Leu | L-β-OH-MePhe |
| 1.018 | Et | L-MeVal | L-Phe | L-MePhe | L-Pro | L-AIle | L-Val | L-Leu | L-MeVal |
| 1.019 | Et | L-MeVal | L-Phe | L-MePhe | L-Pro | L-AIle | L-MeVal | L-Leu | L-MePhe |
| 1.020 | Et | L-MeVal | L-Phe | L-MePhe | L-Pro | L-AIle | L-MeVal | L-Leu | L-MeDH$_{2,3}$Val |

TABLE A-continued

| No. | R¹ | A¹ | A² | A³ | A⁴ | A⁵ | A⁶ | A⁷ | A⁸ |
|---|---|---|---|---|---|---|---|---|---|
| 1.021 | Et | L-MeVal | L-o-FPhe | L-o-F-MePhe | L-Pro | L-Alle | L-MeVal | L-Leu | L-β-OH-MeVal |
| 1.022 | Et | L-MeVal | L-m-FPhe | L-m-F-MePhe | L-Pro | L-Alle | L-MeVal | L-Leu | L-β-OH-MeVal |
| 1.023 | Et | L-MeVal | L-Tyr | L-MeTyr | L-Pro | L-Alle | L-MeVal | L-Leu | L-β-OH-MeVal |
| 1.024 | Et | L-MeVal | L-Phe | L-MePhe | L-4Hyp | L-Alle | L-MeVal | L-Leu | L-β-OH-MeVal |
| 1.025 | Et | L-MeVal | L-Phe | L-MePhe | L-SPro | L-Alle | L-MeVal | L-Leu | L-β-OH-MeVal |
| 1.026 | Et | L-MeVal | L-Phe | L-MePhe | L-Pro | L-Nle | L-MeVal | L-Leu | L-β-OH-MeVal |
| 1.027 | Et | L-MeVal | L-Phe | L-MePhe | L-Pro | L-Alle | L-MeVal | L-Nva | L-β-OH-MeVal |
| 1.028 | Et | L-MeVal | L-Phe | L-MeSer | L-Pro | L-Alle | L-MeVal | L-Leu | L-β-OH-MeVal |
| 1.029 | Et | L-MeVal | L-Phe | L-β-oxo-MePhe | L-Pro | L-Alle | L-MeVal | L-Leu | L-β-OH-MeVal |
| 1.030 | Et | L-MeVal | L-Phe | L-β-AcO-MePhe | L-Pro | L-Alle | L-MeVal | L-Leu | L-β-OH-MeVal |
| 1.031 | Et | L-MeVal | L-Phe | L-MeTyr | L-Pro | L-Alle | L-MeVal | L-Leu | L-β-OH-MeVal |
| 1.032 | Et | L-MeVal | L-Phe | L-MePhe | L-Pro | L-Alle | L-MeLeu | L-Leu | L-β-OH-MeVal |
| 1.033 | Et | L-MeVal | L-Phe | L-MePhe | L-Pro | L-Alle | L-MeVal | L-Alle | L-β-OH-MeVal |
| 1.034 | Et | L-MeVal | L-Phe | L-β-OH-MePhe | L-Pro | L-Alle | L-MeVal | L-Leu | L-MeVal |
| 1.035 | Et | L-Val | L-Phe | L-MePhe | L-Pro | L-Alle | L-MeVal | L-Leu | L-β-OH-MeVal |

Table B: This table discloses 45 compounds of formula (I), wherein R¹ is ethyl, A¹ is L-MeVal, A⁴ is L-Pro, A⁶ is L-MeVal and A⁷ is L-Leu and A², A³, A⁵ and A⁸ are as set forth in Table B below:

TABLE B

| No. | A² | A³ | A⁵ | A⁸ |
|---|---|---|---|---|
| 2.001 | L-Phe | L-MeSer | L-Alle | L-β-OH-MeVal |
| 2.002 | L-Phe | L-β-AcO-MePhe | L-Alle | L-β-OH-MeVal |
| 2.003 | L-Phe | L-MeAla | L-Alle | L-β-OH-MeVal |
| 2.004 | L-Phe | D-MePhe | L-Alle | L-β-OH-MeVal |
| 2.005 | L-Phe | D-MeAla | L-Alle | L-β-OH-MeVal |
| 2.006 | L-Phe | L-MePhe | L-Alle | L-MeDH$_{2,3}$Val |
| 2.007 | L-Phe | D-MeVal | L-Alle | L-β-OH-MeVal |
| 2.008 | L-Cha | D-MeAla | L-Alle | L-β-OH-MeVal |
| 2.009 | L-Tyr | D-MeAla | L-Alle | L-β-OH-MeVal |
| 2.010 | L-Tyr(Ac) | D-MeAla | L-Alle | L-β-OH-MeVal |
| 2.011 | L-Tyr(n-hexanoyl) | D-MeAla | L-Alle | L-β-OH-MeVal |
| 2.012 | L-Tyr(Bzl) | D-MeAla | L-Alle | L-β-OH-MeVal |
| 2.013 | L-Cha | D-MeVal | L-Alle | L-β-OH-MeVal |
| 2.014 | L-Cha | D-MeSer | L-Alle | L-β-OH-MeVal |
| 2.015 | L-Phe | L-MePhe | L-Alle | L-MeThr |
| 2.016 | L-Phe | L-β-OH-MePhe | L-Alle | L-β-OH-MeVal |
| 2.017 | L-Phe | L-m-l-MePhe | L-Alle | L-β-OH-MeVal |
| 2.018 | L-Phe | L-p-l-MePhe | L-Alle | L-β-OH-MeVal |
| 2.019 | L-Phe | L-p-F-MePhe | L-Alle | L-β-OH-MeVal |
| 2.020 | L-Phe | 3-(4-pyridinyl)-N-methyl-L-phenylalanine | L-Alle | L-β-OH-MeVal |
| 2.021 | L-Phe | 4-(4-pyridinyl)-N-methyl-L-phenylalanine | L-Alle | L-β-OH-MeVal |
| 2.022 | L-Phe | 3-[4-(4-methylpiperazin-1-yl)phenyl]phenyl-N-methyl-L-phenylalanine | L-Alle | L-β-OH-MeVal |
| 2.023 | L-Phe | 4-[4-(4-methylpiperazin-1-yl)phen-1-yl]phenyl-N-methyl-L-phenylalanine | L-Alle | L-β-OH-MeVal |
| 2.024 | L-Phe | 4-(2-chloro-5-pyridinyl)-N-methyl-L-phenylalanine | L-Alle | L-β-OH-MeVal |
| 2.025 | L-Phe | 4-(4-fluorophenyl)-N-methyl-L-phenylalanine | L-Alle | L-β-OH-MeVal |
| 2.026 | L-Phe | L-MeTyr(Me) | L-Alle | L-β-OH-MeVal |
| 2.027 | L-Phe | L-MeAla | L-Alle | L-β-OH-MeVal |
| 2.028 | L-Phe | D-MePhe | L-Alle | L-β-OH-MeVal |
| 2.029 | L-Phe | D-MelVal | L-Alle | L-β-OH-MeVal |
| 2.030 | L-Phe | L-MePhe | L-Nle | L-β-OH-MeVal |
| 2.031 | L-Phe | L-MePhe | L-Leu | L-β-OH-MeVal |

TABLE B-continued

| No. | A² | A³ | A⁵ | A⁸ |
|---|---|---|---|---|
| 2.032 | L-Phe | L-MePhe | L-Nva | L-β-OH-MeVal |
| 2.033 | L-Phe | L-MePhe | D-MeAla | L-β-OH-MeVal |
| 2.034 | L-Phe | L-m-Br-MePhe | L-Alle | L-β-OH-MeVal |
| 2.035 | L-Phe | L-p-Br-MePhe | L-Alle | L-β-OH-MeVal |
| 2.036 | L-Phe | 3-phenyl-N-methyl-L-phenylalanine | L-Alle | L-β-OH-MeVal |
| 2.037 | L-Phe | 4-phenyl-N-methyl-L-phenylalanine | L-Alle | L-β-OH-MeVal |
| 2.038 | L-Phe | 3-(1-pyridinyl)-N-methyl-L-phenylalanine | L-Alle | L-β-OH-MeVal |
| 2.039 | L-Phe | 4-(1-pyridinyl)-N-methyl-L-phenylalanine | L-Alle | L-β-OH-MeVal |
| 2.040 | L-Phe | 3-(2-chloro-5-pyridinyl)-N-methyl-L-phenylalanine | L-Alle | L-β-OH-MeVal |
| 2.041 | L-Phe | 3-(4-fluorophenyl)-N-methyl-L-phenylalanine | L-Alle | L-β-OH-MeVal |
| 2.042 | L-Phe | 4-(2-chloro-4-pyridinyl)-N-methyl-L-phenylalanine | L-Alle | L-β-OH-MeVal |
| 2.043 | L-Phe | 3-[4-(piperazin-1-yl)phenyl]phenyl-N-methyl-L-phenylalanine | L-Alle | L-β-OH-MeVal |
| 2.044 | L-Phe | 4-[4-(piperazin-1-yl)phen-1-yl]phenyl-N-methyl-L-phenylalanine | L-Alle | L-β-OH-MeVal |
| 2.045 | L-Cha | L-MePhe | L-Alle | L-β-OH-MeVal |

In a first variant of this first embodiment of the invention, component (A) is preferably a cyclic depsipeptide of formula (I-A1) or a stereoisomer thereof, hereinafter referred to as Aureobasidin A:

In a second variant of this first embodiment of the invention, component (A) is preferably a cyclic depsipeptide of formula (I-A2) or a stereoisomer thereof, hereinafter referred to as Aureobasidin E:

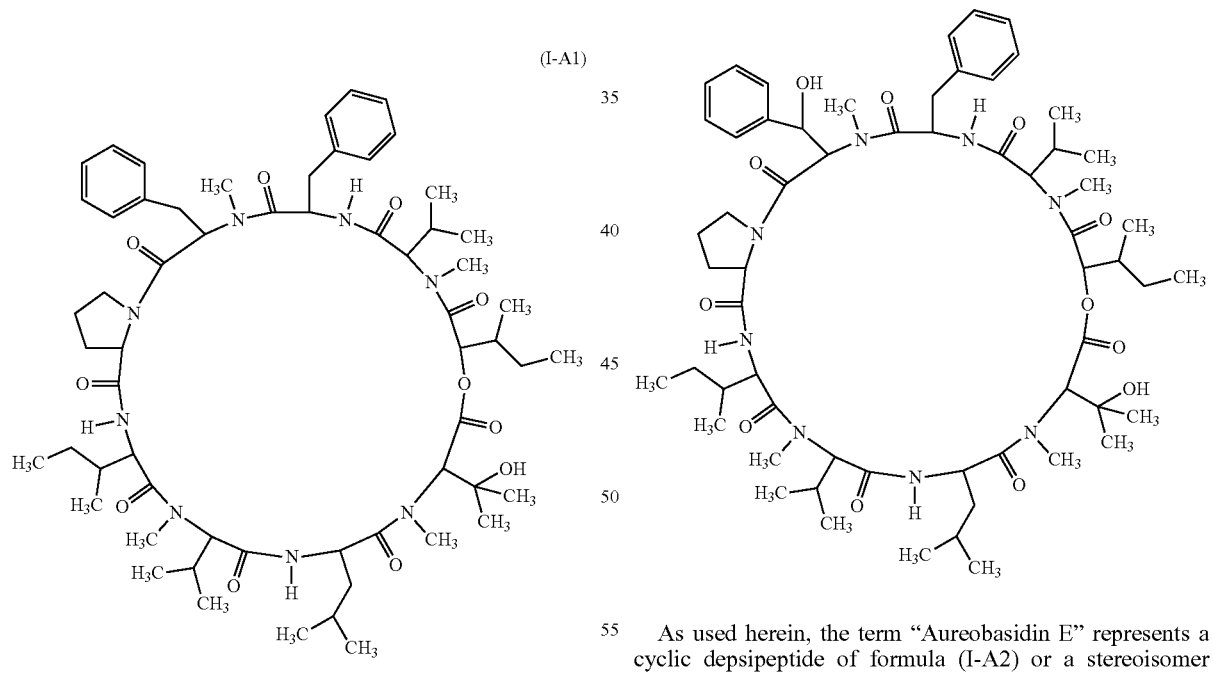

(I-A1)

(I-A2)

As used herein, the term "Aureobasidin A" represents a cyclic depsipeptide of formula (I-A1) or a stereoisomer thereof consisting, in sequence, of units derived from 2(R)-hydroxy-3(R)-methylpentanoic acid ((2R,3R)-Hmp), N-methyl-L-valine (L-MeVal), L-phenylalanine (L-Phe), N-methyl-L-phenylalanine (L-MePhe), L-proline (L-Pro), L-allo-isoleucine (L-Alle), N-methyl-L-valine (L-MeVal), L-leucine (L-Leu) and β-hydroxy-N-methyl-L-valine (L-β-OH-MeVal).

As used herein, the term "Aureobasidin E" represents a cyclic depsipeptide of formula (I-A2) or a stereoisomer thereof consisting, in sequence, of units derived from 2(R)-hydroxy-3(R)-methylpentanoic acid ((2R,3R)-Hmp), N-methyl-L-valine (L-MeVal), L-phenylalanine (L-Phe), β-hydroxy-N-methyl-L-phenylalanine (L-β-OH-MePhe), L-proline (L-Pro), L-allo-isoleucine (L-Alle), N-methyl-L-valine (L-MeVal), L-leucine (L-Leu) and β-hydroxy-N-methyl-L-valine (L-β-OH-MeVal).

In a third variant of this first embodiment of the invention, component (A) is preferably a cyclic depsipeptide of formula (I-A3) or a stereoisomer thereof, hereinafter referred to as Aureobasidin G:

(I-A3)

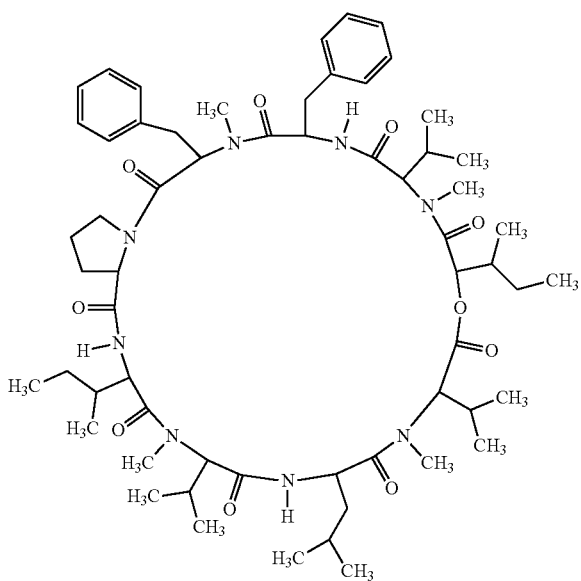

As used herein, the term "Aureobasidin G" represents a cyclic depsipeptide of formula (I-A3) or a stereoisomer thereof consisting, in sequence, of units derived from 2(R)-hydroxy-3(R)-methylpentanoic acid ((2R,3R)-Hmp), N-methyl-L-valine (L-MeVal), L-phenylalanine (L-Phe), N-methyl-L-phenylalanine (L-MePhe), L-proline (L-Pro), L-allo-isoleucine (L-Alle), N-methyl-L-valine (L-MeVal), L-leucine (L-Leu) and N-methyl-L-valine (L-MeVal).

In an embodiment according to the invention, component (A) comprises two or more cyclic depsipeptides of formula (I-A) or stereoisomers thereof as defined above.

In a first variant of this embodiment of the invention, component (A) comprises Aureobasidin A and one or more other cyclic depsipeptides of formula (I-A) or stereoisomers thereof as defined above.

In a second variant of this embodiment of the invention, component (A) comprises Aureobasidin E and one or more other cyclic depsipeptides of formula (I-A) or stereoisomers thereof as defined above.

In a preferred embodiment according to the invention, component (A) comprises Aureobasidin A and one or more cyclic depsipeptides of formula (I) or stereoisomers thereof selected from the group consisting of compounds 1.001 to 1.004 and 1.006 to 1.035 as set forth in Table A. Preferably, component (A) comprises Aureobasidin A and at least one other cyclic depsipeptide of formula (I-A) or a stereoisomer thereof selected from the group consisting of Aureobasidin E and Aureobasidin G.

In another preferred embodiment according to the invention, component (A) comprises Aureobasidin A and one or more cyclic depsipeptides of formula (I) or stereoisomers thereof selected from the group consisting of compounds 2.001 to 2.045 as set forth in Table B.

In embodiments where component (A) comprises Aureobasidin A and one or more other cyclic depsipeptides of formula (I-A) or stereoisomers thereof, said component (A) typically comprises:
from 10% to 99.9% by weight, preferably from 20% to 99.9% by weight, more preferably from 40% to 99.9% by weight of Aureobasidin A, and
from 0.1% to 90% by weight, preferably from 0.1% to 80% by weight, more preferably from 0.1% to 60% by weight of one or more other cyclic depsipeptides of formula (I-A) or stereoisomers thereof.

In embodiments where component (A) comprises Aureobasidin E and one or more other cyclic depsipeptides of formula (I-A) or stereoisomers thereof, said component (A) typically comprises:
from 10% to 99.9% by weight, preferably from 20% to 99.9% by weight, more preferably from 40% to 99.9% by weight of Aureobasidin E, and
from 0.1% to 90% by weight, preferably from 0.1% to 80% by weight, more preferably from 0.1% to 60% by weight of one or more other cyclic depsipeptides of formula (I-A) or stereoisomers thereof.

In an embodiment according to the invention, component (A) typically comprises:
from 60% to 99.5% by weight of Aureobasidin A,
from 0.05% to 5% by weight of Aureobasidin E,
optionally, from 0.1% to 30% by weight of Aureobasidin G, and
optionally, from 0.1% to 10% by weight of one or more other cyclic depsipeptides of formula (I-A) or stereoisomers thereof.

In a second embodiment of the invention, component (A) comprises one or more cyclic depsipeptides of formula (I-B) or stereoisomers thereof:

(I-B)

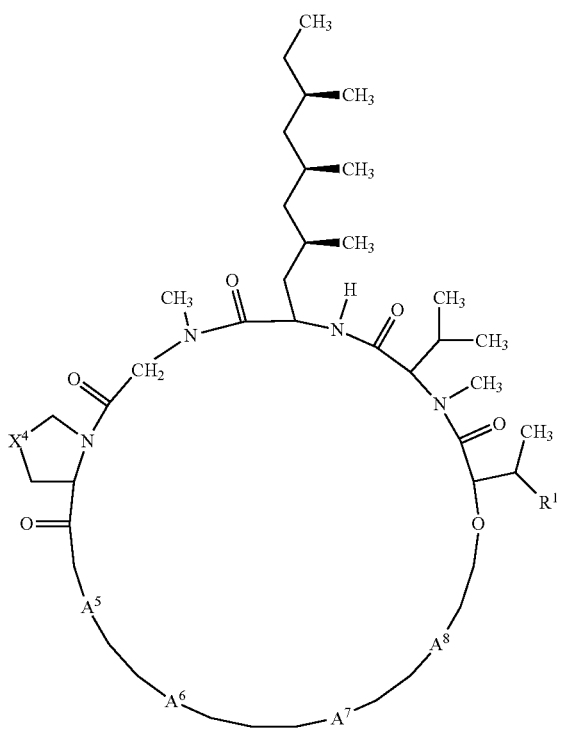

wherein
$R^1$ is methyl or ethyl;
$X^4$ is CH, S or hydroxymethylene;
$A^5$ is an α-amino acid residue selected from the group consisting of L-allo-isoleucine (L-Alle), L-leucine (L-Leu), L-norleucine (L-Nle) and L-valine (L-Val) residues;

A⁶ is an α-amino acid residue selected from the group consisting of N-methyl-L-valine (L-MeVal), N-methyl-L-leucine (L-MeLeu), L-allo-isoleucine (L-AIle) and N-methyl-L-allo-isoleucine (L-MeAIle) residues;

A⁷ is an α-amino acid residue selected from the group consisting of L-leucine (L-Leu), L-allo-isoleucine (L-AIle) and L-norvaline (L-Nva) residues; and A⁸ is an α-amino acid residue selected from the group consisting of β-hydroxy-N-methyl-L-valine (L-β-OH-MeVal), γ-hydroxy-N-methyl-L-valine (L-γ-OH-MeVal), N-methyl-L-valine (L-MeVal), N-methyl-2,3-didehydro-L-valine (L-MeDH$_{2,3}$Val), N-methyl-3,4-didehydro-L-valine (L-MeDH$_{3,4}$Val), N-methyl-L-phenylalanine (L-MePhe), β-hydroxy-N-methyl-L-phenylalanine (L-β-OH-MePhe), N-methyl-L-threonine (L-MeThr), sarcosine (Sar) and N,β-dimethyl-L-aspartic acid (L-N,β-MeAsp) residues.

As used herein, the term "persephanine residue" represents an α-aminoacid residue of formula:

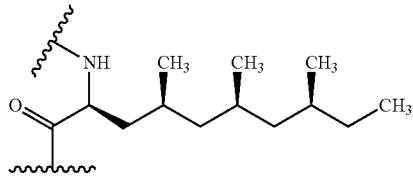 [SMILES: *N[C@@H](C[C@@H](C)C[C@@H](C)C[C@@H](C)CC)C(*)=O]

In a first variant of this second embodiment of the invention, component (A) is preferably a cyclic depsipeptide of formula (I-B1) or a stereoisomer thereof, hereinafter referred to as Persephacin A:

(I-B1)

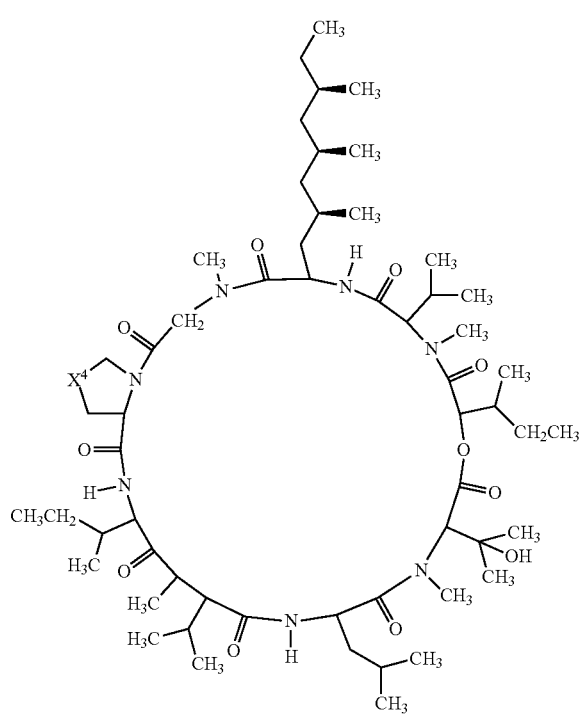

As used herein, the term "Persephacin A" represents a cyclic depsipeptide of formula (I-B1) or a stereoisomer thereof consisting, in sequence, of units derived from 2(R)-hydroxy-3(R)-methylpentanoic acid ((2R,3R)-Hmp), N-methyl-L-valine (L-MeVal), L-persephanine, sarcosine (Sar), L-proline (L-Pro), L-allo-isoleucine (L-AIle), N-methyl-L-valine (L-MeVal), L-leucine (L-Leu) and β-hydroxy-N-methyl-L-valine (L-β-OH-MeVal).

In a second variant of this second embodiment of the invention, component (A) is preferably a cyclic depsipeptide of formula (I-B2) or a stereoisomer thereof, hereinafter referred to as Persephacin B:

(I-B2)

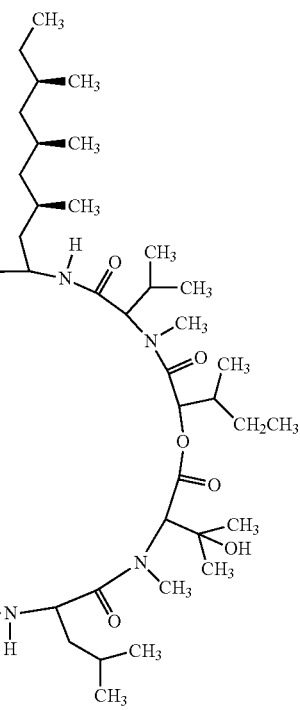

As used herein, the term "Persephacin B" represents a cyclic depsipeptide of formula (I-B2) or a stereoisomer thereof consisting, in sequence, of units derived from 2(R)-hydroxy-3(R)-methylpentanoic acid ((2R,3R)-Hmp), N-methyl-L-valine (L-MeVal), L-persephanine, sarcosine (Sar), L-proline (L-Pro), L-allo-isoleucine (L-AIle), L-allo-isoleucine (L-AIle), L-leucine (L-Leu) and β-hydroxy-N-methyl-L-valine (L-β-OH-MeVal).

In a third variant of this second embodiment of the invention, component (A) is preferably a cyclic depsipeptide of formula (I-B3) or a stereoisomer thereof, hereinafter referred to as Persephacin C:

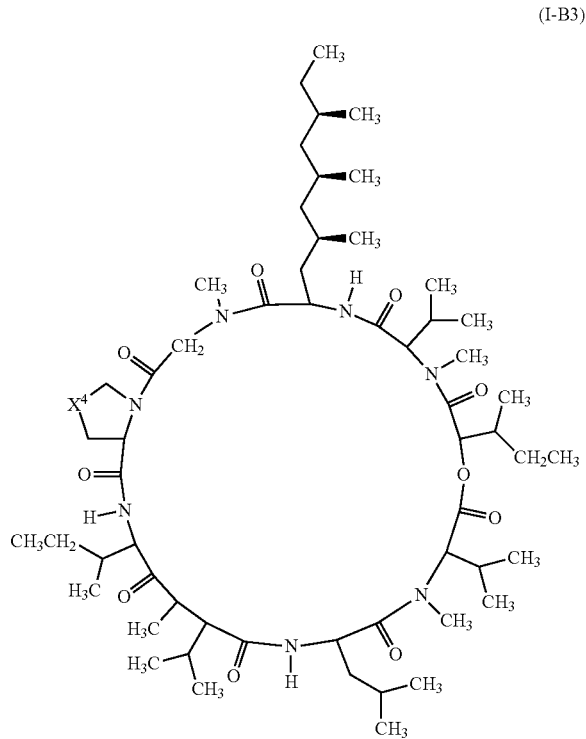

(I-B3)

As used herein, the term "Persephacin C" represents a cyclic depsipeptide of formula (I-B3) or a stereoisomer thereof consisting, in sequence, of units derived from 2(R)-hydroxy-3(R)-methylpentanoic acid ((2R,3R)-Hmp), N-methyl-L-valine (L-MeVal), L-persephanine, sarcosine (Sar), L-proline (L-Pro), L-allo-isoleucine (L-Alle), N-methyl-L-valine (L-MeVal), L-leucine (L-Leu) and N-methyl-L-valine (L-MeVal).

In an embodiment according to the invention, component (A) comprises two or more cyclic depsipeptides of formula (I-B) or stereoisomers thereof as defined above.

In a variant of this embodiment of the invention, component (A) comprises Persephacin A and one or more other cyclic depsipeptides of formula (I-B) or stereoisomers thereof as defined above.

In embodiments where component (A) comprises Persephacin A and one or more other cyclic depsipeptides of formula (I-B) or stereoisomers thereof, said component (A) typically comprises:
from 10% to 99.9% by weight, preferably from 20% to 99.9% by weight, more preferably from 40% to 99.9% by weight of Persephacin A, and
from 0.1% to 90% by weight, preferably from 0.1% to 80% by weight, more preferably from 0.1% to 60% by weight of one or more other cyclic depsipeptides of formula (I-B) or stereoisomers thereof.

In an another embodiment according to the invention, component (A) comprises one or more cyclic depsipeptides of formula (I-A) or stereoisomers thereof and one or more cyclic depsipeptides of formula (I-B) or stereoisomers thereof as defined above.

In a variant of this embodiment of the invention, component (A) comprises Aureobasidin A and one or more cyclic depsipeptides of formula (I-B) or stereoisomers thereof as defined above.

In another variant of this embodiment of the invention, component (A) comprises Aureobasidin A, one or more other cyclic depsipeptides of formula (I-A) or stereoisomers thereof as defined above, and one or more cyclic depsipeptides of formula (I-B) or stereoisomers thereof as defined above.

In another variant of this embodiment of the invention, component (A) comprises Aureobasidin A, at least one other cyclic depsipeptide of formula (I-A) or a stereoisomer thereof selected from the group consisting of Aureobasidin E and Aureobasidin G, and one or more cyclic depsipeptides of formula (I-B) or stereoisomers thereof as defined above.

In an another embodiment according to the invention, component (A) is a strain of *Aureobasidium pullulans*, generally a strain of *Aureobasidium pullulans* R106.

It is understood, without this limiting the scope of the invention, that one or more cyclic depsipeptides of formula (I-A) or stereoisomers thereof as defined above can be obtained from a fermentation broth of a strain of *Aureobasidium pullulans*, generally a strain of *Aureobasidium pullulans* R106.

In another embodiment according to the invention, component (A) is a strain or a genetically modified strain of *Sphaceloma coryli*.

It is understood, without this limiting the scope of the invention, that one or more cyclic depsipeptides of formula (I-B) or stereoisomers thereof as defined above can be obtained from a fermentation broth of a strain or a genetically modified strain of *Sphaceloma coryli*.

As used herein, the term "fermentation broth" refers to a composition obtained from a process of fermentation of a strain.

In another embodiment according to the invention, component (A) is a fermentation broth comprising two or more cyclic depsipeptides of formula (I) or stereoisomers thereof as defined above.

In a first variant of this embodiment of the invention, component (A) is a fermentation broth comprising two or more cyclic depsipeptides of formula (I-A) or stereoisomers thereof as defined above.

In an embodiment according to the invention, component (A) is a fermentation broth comprising Aureobasidin A and one or more other cyclic depsipeptides of formula (I-A) or stereoisomers thereof as defined above.

In another embodiment according to the invention, component (A) is a fermentation broth comprising Aureobasidin E and one or more other cyclic depsipeptides of formula (I-A) or stereoisomers thereof as defined above.

In a second variant of this embodiment of the invention, component (A) is a fermentation broth comprising two or more cyclic depsipeptides of formula (I-B) or stereoisomers thereof as defined above, preferably component (A) is a fermentation broth comprising Persephacin A and one or more other cyclic depsipeptides of formula (I-B) or stereoisomers thereof as defined above.

The component (B) compounds are referred to herein and above by a so-called "ISO common name" or another "common name" being used in individual cases or a trademark name. The component (B) compounds are known and are commercially available and/or can be prepared using procedures known in the art and/or procedures reported in the literature.

In a preferred embodiment according to the invention, component (B) is a compound selected from the group consisting of quinofumelin, N-[(1R)-1-benzyl-1,3-dimethyl-butyl]-8-fluoro-quinoline-3-carboxamide/N-[(1S)-1-benzyl-1,3-dimethyl-butyl]-8-fluoro-quinoline-3-carboxamide, N-[(1R)-1-benzyl-3,3,3-trifluoro-1-methyl-propyl]-8-fluoro-quinoline-3-carboxamide/N-[(1S)-1-benzyl-3,3,3-trifluoro-1-methyl-propyl]-8-fluoro-quinoline-3-carboxamide, N-[(1R)-1-benzyl-3-chloro-1-methyl-but-3-enyl]-8-fluoro-quinoline-3-carboxamide/N-[(1S)-1-benzyl-3-chloro-1-methyl-but-3-enyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline and 6-chloro-4,4-difluoro-3,3-dimethyl-1-(4-methylbenzimidazol-1-yl)isoquinoline.

In a preferred composition according to the invention, component (A) comprises one or more cyclic depsipeptides of formula (I-A) or stereoisomers thereof as defined above, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is 100:1 to 1:1000, preferably from 100:1 to 1:500, more preferably from 50:1 to 1:200, even more preferably from 50:1 to 1:20.

In another preferred composition according to the invention, component (A) is Aureobasidin A, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3- dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:500.

In another preferred composition according to the invention, component (A) is Aureobasidin A, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 50:1 to 1:200.

In another preferred composition according to the invention, component (A) is Aureobasidin A, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 50:1 to 1:20.

In another preferred composition according to the invention, component (A) is Aureobasidin E, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2- ethylpyrazol-3-yl)phenyl]methyl]-7,8-difluoro-2-methyl-quinoline, wherein the weight ratio of component (A) to component (B) is from 100:1 to 1:1000.

In another preferred composition according to the invention, component (A) is Aureobasidin E, and component (B) is a compound selected from the group consisting of qui-nofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quino-line-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:500.

In another preferred composition according to the invention, component (A) is Aureobasidin E, and component (B) is a compound selected from the group consisting of qui-nofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quino-line-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 50:1 to 1:200.

In another preferred composition according to the invention, component (A) is Aureobasidin E, and component (B) is a compound selected from the group consisting of qui-nofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quino-line-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 50:1 to 1:20.

In another preferred composition according to the invention, component (A) comprises Aureobasidin A and one or more cyclic depsipeptides of formula (I) or stereoisomers thereof selected from the group consisting of compounds 1.001 to 1.004 and 1.006 to 1.035 as set forth in Table A, preferably component (A) comprises Aureobasidin A and at least one other cyclic depsipeptide of formula (I-A) or a stereoisomer thereof selected from the group consisting of Aureobasidin E and Aureobasidin G, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:1000.

In another preferred composition according to the invention, component (A) comprises Aureobasidin A and one or more cyclic depsipeptides of formula (I) or stereoisomers thereof selected from the group consisting of compounds 1.001 to 1.004 and 1.006 to 1.035 as set forth in Table A, preferably component (A) comprises Aureobasidin A and at least one other cyclic depsipeptide of formula (I-A) or a stereoisomer thereof selected from the group consisting of Aureobasidin E and Aureobasidin G, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:500.

In another preferred composition according to the invention, component (A) comprises Aureobasidin A and one or more cyclic depsipeptides of formula (I) or stereoisomers thereof selected from the group consisting of compounds 1.001 to 1.004 and 1.006 to 1.035 as set forth in Table A, preferably component (A) comprises Aureobasidin A and at least one other cyclic depsipeptide of formula (I-A) or a stereoisomer thereof selected from the group consisting of Aureobasidin E and Aureobasidin G, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethylisoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 50:1 to 1:200.

In another preferred composition according to the invention, component (A) comprises Aureobasidin A and one or more cyclic depsipeptides of formula (I) or stereoisomers thereof selected from the group consisting of compounds 1.001 to 1.004 and 1.006 to 1.035 as set forth in Table A, preferably component (A) comprises Aureobasidin A and at least one other cyclic depsipeptide of formula (I-A) or a stereoisomer thereof selected from the group consisting of Aureobasidin E and Aureobasidin G, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 50:1 to 1:20.

In another preferred composition according to the invention, component (A) is a strain of *Aureobasidium pullulans*, generally a strain of *Aureobasidium pullulans* R106, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4- methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:1000, preferably from 100:1 to 1:500, more preferably from 50:1 to 1:200, even more preferably from 50:1 to 1:20.

In another preferred composition according to the invention, component (A) is a fermentation broth comprising one or more cyclic depsipeptides of formula (I-A) or stereoisomers thereof as defined above, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:1000, preferably from 100:1 to 1:500, more preferably from 50:1 to 1:200, even more preferably from 50:1 to 1:20.

In another preferred composition according to the invention, component (A) is a fermentation broth comprising Aureobasidin A and one or more other cyclic depsipeptides of formula (I-A) or stereoisomers thereof as defined above, and component (B) is a compound selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline, wherein the weight ratio of component (A) to component (B) is from 100:1 to 1:1000, preferably from 100:1 to 1:500, more preferably from 50:1 to 1:200, even more preferably from 50:1 to 1:20.

The compositions of the invention may in certain circumstances comprise an additional active ingredient component (C), which is different to component (B), wherein component (C) is selected from the list of components (B) as defined according to the invention.

In embodiments of the invention where the compositions comprise a component (A), a component (B) and a component (C), the weight ratio of component (A) to the sum of component (B) and component (C) may be from 100:1 to 1:1000, more preferably from 100:1 to 1:500, even more preferably from 50:1 to 1:200, still more preferably from 50:1 to 1:20.

In some preferred embodiments of the invention, the weight ratio of component (A) to the sum of component (B) and component (C) may be of 1:1, or 1:2, or 1:4, or 1:8, or 2:1, or 4:1, or 8:1, or 16:1, or 20:1, or 1:200, or 1:100, or 1:50, or 1:25, or 1:20, or 1:12.5, or 1:10, or 1:6.2, or 1:5, or 1:2.5.

The compounds of formula (I) or stereoisomers thereof according to the invention can be prepared by methods known to the person skilled in the art. The compounds of formula (I) can be either purchased or prepared using synthetic or semi-synthetic chemistry or fermentation processes. For example, the compounds of formula (I-A) or stereoisomers thereof can be prepared by methods known in Takesako et al., *The Journal of Antibiotics,* 1991, 44, 919-

924, Takesako et al., *Tetrahedron*, 1996, 52, 4327-4346 and Maharani et al. *Tetrahedron*, 2014, 70, 2351-2358. A fermentation broth comprising one or more compounds of formula (I-A) or stereoisomers thereof can be obtained from a process of fermentation of a strain of *Aureobasidium pullulans*, generally by a strain of *Aureobasidium pullulans* R106. A fermentation broth comprising one or more compounds of formula (I-B) or stereoisomers thereof can be obtained from a process of fermentation of a strain of *Sphaceloma coryli*. The fermentation broth may not require purification. Alternatively, one or more compounds of formula (I) can be isolated from the fermentation broth and purified, e.g. by chromatography using a sorbent (e.g., silica and reverse phase silica gels, optically active sorbents, resins) or one or more solvents (e.g., partitioning, counter current separation, mixture of polyphasic solvents) or other chemical means (e.g., crystallization, recrystallization, salt formation, and precipitation) to achieve the final degree of purity. Purity of the compounds of formula (I) or stereoisomers thereof can include, but is not limited to, a range of from 10% to 20%, or from 20% to 30%, or from 30% to 40%, or from 40% to 50%, or from 50% to 60%, or from 60% to 70%, or from 70% to 80%, or from 80% to 90%, or from 90% to 100%. The purity of the compounds of formula (I) or stereoisomers thereof can be measured by any technique known to the person skilled in the art, including NMR, mass spectrometry, liquid chromatography-mass spectrometry (LCMS), high performance liquid chromatography (HPLC) and other analytical means.

The term "fungicide" as used herein means a compound that controls, modifies, or prevents the growth of fungi. The term "fungicidally effective amount" means the quantity of such a compound or combination of such compounds that is capable of producing an effect on the growth of fungi. Controlling or modifying effects include all deviation from natural development, such as killing, retardation and the like, and prevention includes barrier or other defensive formation in or on a plant to prevent fungal infection.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

The term "locus" as used herein means fields in or on which plants are growing, or where seeds of cultivated plants are sown, or where seed will be placed into the soil. It includes soil, seeds, and seedlings, as well as established vegetation.

Throughout this document the expression "composition" stands for the various mixtures or combinations of components (A) and (B) (including the above-defined embodiments), for example in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the components (A) and (B) is not essential for working the present invention.

The composition according to the invention is effective against harmful microorganisms, such as microorganisms, that cause phytopathogenic diseases, in particular against phytopathogenic fungi and bacteria.

The composition of the invention may be used to control plant diseases caused by a broad spectrum of fungal plant pathogens in the Basidiomycete, Ascomycete, Oomycete and/or Deuteromycete, Blasocladiomycete, Chrytidiomycete, Glomeromycete and/or Mucoromycete classes:

Oomycetes, including *Phytophthora* diseases such as those caused by *Phytophthora capsici*, *Phytophthora infestans*, *Phytophthora sojae*, *Phytophthora fragariae*, *Phytophthora nicotianae*, *Phytophthora cinnamomi*, *Phytophthora citricola*, *Phytophthora citrophthora* and *Phytophthora erythroseptica*; *Pythium* diseases such as those caused by *Pythium aphanidermatum*, *Pythium arrhenomanes*, *Pythium graminicola*, *Pythium irregulare* and *Pythium ultimum*; diseases caused by Peronosporales such as *Peronospora destructor*, *Peronospora parasitica*, *Peronospora manshurica*, *Peronospora tabacina*, Plasmopara viticola, Plasmopara *halstedii*, *Pseudoperonospora cubensis*, *Albugo candida*, *Sclerophthora macrospora* and *Bremia lactucae*; and others such as *Aphanomyces cochlioides*, *Labyrinthula zosterae*, *Peronosclerospora sorghi* and *Sclerospora graminicola*;

Ascomycetes, including blotch, spot, blast or blight diseases and/or rots for example those caused by Pleosporales such as *Stemphylium solani*, *Stagonospora tainanensis*, *Spilocaea oleaginea*, *Setosphaeria turcica*, *Pyrenochaeta lycoperisici*, *Pleospora herbarum*, *Phoma destructiva*, *Phaeosphaeria herpotrichoides*, *Phaeocryptocus gaeumannii*, *Ophiosphaerella graminicola*, *Ophiobolus graminis*, *Leptosphaeria maculans*, *Hendersonia creberrima*, *Helminthosporium triticirepentis*, *Drechslera glycines*, *Didymella bryoniae*, *Cycloconium oleagineum*, *Corynespora cassiicola*, *Cochliobolus sativus*, *Bipolaris cactivora*, *Venturia inaequalis*, *Pyrenophora teres*, *Pyrenophora tritici*-repentis, *Alternaria alternata*, *Alternaria brassicicola*, *Alternaria solani* and *Alternaria tomatophila*, Capnodiales such as *Septoria tritici*, *Septoria nodorum*, *Septoria glycines*, *Cercospora arachidicola*, *Cercospora beticola*, *Cercospora sojina*, *Cercospora zeae-maydis*, *Cercosporella capsellae* and *Cercosporella herpotrichoides*, *Cladosporium carpophilum*, *Cladosporium effusum*, *Passalora fulva*, *Cladosporium oxysporum*, *Dothistroma septosporum*, *Isariopsis clavispora*, *Mycosphaerella fijiensis*, *Mycosphaerella graminicola*, *Mycovellosiella koepkeii*, *Phaeoisariopsis bataticola*, *Pseudocercospora vitis*, *Pseudocercosporella herpotrichoides*, *Ramularia beticola*, *Ramularia collo-cygni*, Magnaporthales such as *Gaeumannomyces graminis*, *Magnaporthe grisea*, *Magnaporthe oryzae*, Diaporthales such as *Anisogramma anomala*, *Apiognomonia errabunda*, *Cytospora platani*, *Diaporthe phaseolorum*, *Discula destructiva*, *Gnomonia fructicola*, *Greeneria uvicola*, *Melanconium juglandinum*, *Phomopsis viticola*, *Sirococcus clavigignenti-juglandacearum*, *Tubakia dryina*, *Dicarpella* spp., *Valsa ceratosperma*, and others such as *Actinothyrium graminis*, *Ascochyta pisi*, *Aspergillus flavus*, *Aspergillus fumigatus*, *Aspergillus nidulans*, *Asperisporium caricae*, *Blumeriella jaapii*, *Candida* spp., *Capnodium ramosum*, *Cephaloascus* spp., *Cephalosporium gramineum*, *Ceratocystis paradoxa*, *Chaetomium* spp., *Hymenoscyphus pseudoalbidus*, *Coccidioides* spp., *Cylindrosporium padi*, *Diplocarpon malae*, *Drepanopeziza campestris*, *Elsinoe ampelina*, *Epicoccum nigrum*, *Epidermophyton* spp., *Eutypa lata*, *Geotrichum candidum*, *Gibellina cerealis*, *Gloeocer-* cospora sorghi, Gloeodes pomigena, Gloeosporium perennans; Gloeotinia temulenta, Griphospaeria corticola, Kabatiella lini, Leptographium microsporum, Leptosphaerulinia crassiasca, Lophodermium seditiosum, Marssonina graminicola, Microdochium nivale, Monilinia fructicola, Monilinia laxa, Monilinia fructigena, Monographella albescens, Monosporascus cannonballus, Naemacyclus spp., Ophiostoma novo-ulmi, Paracoccidioides brasiliensis, Penicillium expansum, Pestalotia rhododendri, Petriellidium spp., Pezicula spp., Phialophora gregata, Phialophora tetraspora, Phyllachora pomigena, Phymatotrichum omnivora, Physalospora abdita, Plectosporium tabacinum, Polyscytalum pustulans, Pseudopeziza medicaginis, Pyrenopeziza brassicae, Ramulispora sorghi, Rhabdocline pseudotsugae, Rhynchosporium secalis, Sacrocladium oryzae, Scedosporium spp., Schizothyrium pomi, Sclerotinia sclerotiorum, Sclerotinia minor, Sclerotium spp., Typhula ishikariensis, Seimatosporium mariae, Lepteutypa cupressi, Septocyta ruborum, Sphaceloma perseae, Sporonema phacidioides, Stigmina palmivora, Tapesia yallundae, Taphrina bullata, Thielviopsis basicola, Trichoseptoria fructigena, Zygophiala jamaicensis; powdery mildew diseases for example those caused by Erysiphales such as Blumeria graminis, Erysiphe polygoni, Uncinula necator, Sphaerotheca fuligena, Podosphaera leucotricha, Podospaera macularis, Podosphaera pannosa, Golovinomyces cichoracearum, Leveillula taurica, Microsphaera diffusa, Oidiopsis gossypii, Phyllactinia guttata and Oidium arachidis; molds for example those caused by Botryosphaeriales such as Dothiorella aromatica, Diplodia seriata, Guignardia bidwellii, Botrytis cinerea, Botrytis tracheiphila, Botryotinia allii, Botryotinia fabae, Fusicoccum amygdali, Lasiodiplodia theobromae, Macrophoma theicola, Macrophomina phaseolina, Phyllosticta cucurbitacearum; anthracnoses for example those caused by Glommerelales such as Colletotrichum gloeosporioides, Colletotrichum lagenarium, Colletotrichum gossypii, Glomerella cingulata, and Colletotrichum graminicola; and wilts or blights for example those caused by Hypocreales such as Acremonium strictum, Claviceps purpurea, Fusarium culmorum, Fusarium graminearum, Fusarium brasiliense, Fusarium tucumaniae, Fusarium cuneirostrum, Fusarium virguliforme, Fusarium oxysporum, Fusarium subglutinans, Fusarium oxysporum f.sp. cubense, Gerlachia nivale, Gibberella fujikuroi, Gibberella zeae, Gliocladium spp., Myrothecium verrucaria, Nectria ramulariae, Trichoderma viride, Trichothecium roseum, and Verticillium theobromae;

Basidiomycetes, including smuts for example those caused by Ustilaginales such as Ustilaginoidea virens, Ustilago nuda, Ustilago tritici, Ustilago zeae, rusts for example those caused by Pucciniales such as Cerotelium fici, Chrysomyxa arctostaphyli, Coleosporium ipomoeae, Hemileia vastatrix, Puccinia arachidis, Puccinia cacabata, Puccinia graminis, Puccinia recondita, Puccinia sorghi, Puccinia hordei, Puccinia striiformis f.sp. hordei, Puccinia striiformis f.sp. secalis, Pucciniastrum coryli, or Uredinales such as Cronartium ribicola, Gymnosporangium juniperi-viginianae, Melampsora medusae, Phakopsora pachyrhizi, Phakopsora meibomiae, Phragmidium mucronatum, Physopella ampelosidis, Tranzschelia discolor and Uromyces viciae-fabae; and other rots and diseases such as those caused by Cryptococcus spp., Exobasidium vexans, Marasmiellus inoderma, Mycena spp., Sphacelotheca reiliana, Typhula ishikariensis, Urocystis agropyri, Itersonilia haperplexans, Corticium invisum, Laetisaria fuciformis, Waitea circinata, Rhizoctonia solani, Thanetephorus cucurmeris, Entyloma dahliae, Entylomella microspora, Neovossia moliniae and Tilletia caries;

Blastocladiomycetes, such as Physoderma maydis; and

Mucoromycetes, such as Choanephora cucurbitarum; Mucor spp.; Rhizopus arrhizus, Rhizopus oryzae, Rhizopus stolonifera, Rhizopus nigricans, as well as diseases caused by other species and genera closely related to those listed above.

In addition to their fungicidal activity, the compositions may also have activity against bacteria such as Erwinia amylovora, Erwinia caratovora, Xanthomonas campestris, Pseudomonas syringae, Streptomyces scabies and other related species as well as certain protozoa.

The compositions according to the invention are particularly effective against phytopathogenic fungi belonging to the following classes: Ascomycetes (e.g. Venturia, Alternaria, Podosphaera, Erysiphe, Magnaporthe, Monilinia, Mycosphaerella, Uncinula); Basidiomycetes (e.g. the genus Hemileia, Rhizoctonia, Phakopsora, Puccinia, Ustilago, Tilletia); Fungi imperfecti (also known as Deuteromycetes; e.g. Botrytis, Colletotrichum, Helminthosporium, Rhynchosporium, Fusarium, Septoria, Cercospora, Alternaria, Penicillium, Pyricularia and Pseudocercosporella); Oomycetes (e.g. Phytophthora, Peronospora, Pseudoperonospora, Albugo, Bremia, Pythium, Pseudosclerospora, Plasmopara).

Preferably, the compositions according to the invention may be effective against phytopathogenic fungi selected from the group consisting of Alternaria, Ascochyta, Botrytis, Cercospora, Cochliobolus sativus, Colletotrichum, Colletotrichum lagenarium, Corynespora, Erysiphe, Erysiphe cichoracearum, Sphaerotheca fuliginea, Fusarium, Fusarium oxysporum, Gaumannomyces graminis, Guignardia, Helminthosporium, Hemileia vastatrix, Magnaporthe, Magnaporthe oryzae, Monilinia, Mycosphaerella, Mycosphaerella arachidis, Phakopsora, Phoma, Phomopsis, Puccinia, Pseudocercosporella, Pseudopezicula, Phragmidium mucronatum, Podosphaera, Pyrenophora, Pyrenophora teres, Pyricularia, Pyricularia oryzae, Ramularia, Ramularia collo-cygni, Rhizoctonia, Rhizoctonia solani, Rhynchosporium secalis, Sclerotinia, Septoria, Septoria tritici, Sphacelotheca reilliana, Tilletia, Urocystis occulta, Uncinula, Ustilago, Venturia, Monilia, and Penicillium.

The compositions of the present invention may be particularly effective against phytopathogenic fungi selected from the group consisting of Alternaria, Botrytis, Cercospora, Colletotrichum, Corynespora, Guignardia, Mycosphaerella, Monilinia, Penicillium, Phakopsora, Phomopsis, Podosphaera, Pseudopezicula, Septoria, Uncinula and Venturia.

The compositions of the present invention may be effective especially against phytopathogenic fungi selected from the group consisting of Alternaria solani, Alternaria alternata, Alternaria porri, Botrytis cinerea, Botrytis allii, Botrytis squamosa, Cercospora capsici, Colletotrichum lagenarium, Corynespora cassiicola, Guignardia bidwellii, Monilinia fructicola, Monilinia fructigena, Monilinia laxa, Penicillium digitatum, Penicillium italicum, Penicillium expansum, Phomopsis viticola, Podosphaera leucotricha, Podosphaera xanthii, Pseudopezicula tracheiphila, Septoria tritici, Uncinula necator and Venturia inaequalis.

According to the invention "useful plants" typically comprise the following perennial or annual plants:

grains such as cereals, e.g. barley, maize (corn), millet, oats, rice, rye, sorghum, triticale, tritordeum and wheat, amaranth, buckwheat, chia, quinoa, and canihua;

fruits and tree nuts such as grape vine (table and wine grapes), almond, apple, apricot, avocado, banana, blackberry, blueberry, breadfruit, cacao, cashew, cherimoya, cherry, chestnut (for nuts), chokeberry, citrus (including grapefruit, lime, lemon, orange, calamansi), coconut, coffee, cranberry, currant, date, feijoa fruit, fig, filbert (hazelnut), gooseberry, guava, kiwi, litchi, macadamia, mango, nectarine, olive, papaya, passion fruit, peach, pear, pecan, persimmon, pineapple, pistachio, plum (including prune), pomegranate, quince, raspberry, strawberry, suriname cherry, and walnut;

vegetables such as artichoke, asparagus, bean (snap, green, dry, edible), beet (table), broccoli/broccoli raab, Brussels sprouts, cabbage (incl. Chinese), carrot, cauliflower, celeriac, celery, chickpeas, chive, collards (including kale), cucumber, edamame, eggplant, endive, pea (garden, dry, edible), garlic, horseradish, kohlrabi, leek, lentils, lettuce, melon, mushroom (cultivated), mustard and other greens, okra, onion, parsley, parsnip, pepper, potato, prickly pear, pumpkin, radish, rhubarb, rutabaga, salsify, spinach, squash (summer and winter), sweet corn, sweet potato, Swiss chard, taro, tomato/tomatillo, turnip, and watermelon;

field crops such as sugar beet, sugarcane, tobacco, peanut, soybean;

oil seed crops such as oilseed rape (canola), mustard, camelina, crambe, sunflower, poppy, sesame, and safflower;

forage crops for example alfalfa, clover, cowpea, vetches, sainfoin, lupine, fodder beet, ryegrass, kentucky bluegrass, fescue, orchard grass; fiber crops such as cotton, flax, hemp, jute and sisal;

forest plants including coniferous species e.g. larch, fir, or pine, temperate and tropical hardwoods e.g. oak, birch, beech, teak, or mahogany, and tree species in arid zones, e.g. *eucalyptus* tree;

horticulture crops such as hops, maple (maple syrup), tea, natural rubber plants and turfgrass e.g. bentgrass, kentucky bluegrass, ryegrass, Fescues, bermudagrass, centipede grass, crested hairgrass, kikuyugrass, st. augustinegrass, zoysiagrass, dichondra, timothy grass, tufted hairgrass;

floriculture, greenhouse and nursery plants including flowers, broad-leaved trees or evergreens as an example begonia, dahlia, geranium, impatiens, petunia, coleus, marigold, pansy, snapdragon, african violet, azalea, florist chrysanthemum, flowering bulbs, hydrangea, lily, orchid, poinsettia, rose, astilbe, coreopsis, delphinium, dianthus, heuchera, hosta, phlox, rudbeckia, salvia, vinca, columbine, daylily, garden chrysanthemum, ivy, ornamental grasses, peony, delphinium, gladiolus, iris, snapdragon, tulip, eucalyptus, pittosporum, fern, anthurium, dieffenbachia, dracaena, ficus, philodendron, spathipyllum, bromeliad, cacti, palm, balsam fir, blue spruce, douglas fir, fraser fir, noble fir, scotch pine, white pine, magnolia, ash, elm, flowering cherry, flowering plum, hawthorn, redbud, and serviceberry;

propagative materials such as bare-root divisions, cuttings, liners, plug seedlings, seeds, tissue-cultured plantlets, and prefinished plants;

culinary herbs and spices for example allspice, *Angelica* spp., anise, annatto, arugula, asafetida, basil (all types), bay (cultivated), bladder wrack (seaweed), Bolivian coriander, borage, calendula (herbal uses), candle nut, caper, caraway, cardamom, cassia spice, cinnamon, clary sage, cloves, catnip, chamomile, chervil, chicory, cicely, cilantro, comfrey, coriander, cress, cumin, curry, dill, fennel, fenugreek, file (cultivated), fingerroot, galangal, ginger, hops, horehound, hyssop, lavender, lemon balm, lemon thyme, lovage, mace, mahlab, malabathrum, marjoram, mint (all types), mugwort, nutmeg, oregano, orris root, paprika, parsley, pepper, rosemary, rue, saffron, sage (all types), savory (all types), sorrel, tarragon, thyme, turmeric, vanilla, wasabi, and watercress; and medicinal herbs for example arum, *Artemisia* spp., astralagus, boldo, comfrey, coneflower, fenugreek, feverfew, foxglove, *Ginkgo biloba*, ginseng, goat's rue, goldenseal, gypsywort, horehound, horsetail, lavender, liquorice, marshmallow, mullein, nettle, passionflower, patchouli, pennyroyal, pokeweed, skullcap, sorrel, St. John's wort, senna, sow thistle, stevia, tansy, witch hazel, wood betony, wormwood, yarrow, yerba buena, and Ylang Ylang.

This list does not represent any limitation, however, preferably, the useful plant may be selected from the group consisting of wheat, barley, rice, soybean, apples, almonds, cherries, raspberries, grapes, cucumbers, peanuts, tomatoes, strawberries, citrus and bananas.

The term "useful plants" is to be understood as including also useful plants that have been rendered tolerant to herbicides like bromoxynil or classes of herbicides (such as, for example, HPPD inhibitors, ALS inhibitors, for example primisulfuron, prosulfuron and trifloxysulfuron, EPSPS (5-enol-pyrovyl-shikimate-3-phosphate-synthase) inhibitors, GS (glutamine synthetase) inhibitors) as a result of conventional methods of breeding or genetic engineering. An example of a crop that has been rendered tolerant to imidazolinones, e.g. imazamox, by conventional methods of breeding (mutagenesis) is Clearfield® summer rape (Canola). Examples of crops that have been rendered tolerant to herbicides or classes of herbicides by genetic engineering methods include glyphosate- and glufosinate-resistant maize varieties commercially available under the trade names RoundupReady®, Herculex I® and LibertyLink®.

The term "useful plants" is to be understood as including also useful plants which have been so transformed by the use of recombinant DNA techniques that they are capable of synthesising one or more selectively acting toxins, such as are known, for example, from toxin-producing bacteria. Examples of toxins which can be expressed include 6-endotoxins, vegetative insecticidal proteins (Vip), insecticidal proteins of bacteria colonising nematodes, and toxins produced by scorpions, arachnids, wasps and fungi.

An example of a crop that has been modified to express the *Bacillus thuringiensis* toxin is the Bt maize KnockOut® (Syngenta Seeds). An example of a crop comprising more than one gene that codes for insecticidal resistance and thus expresses more than one toxin is VipCot® (Syngenta Seeds). Crops or seed material thereof can also be resistant to multiple types of pests (so-called stacked transgenic events when created by genetic modification). For example, a plant can have the ability to express an insecticidal protein while at the same time being herbicide tolerant, for example Herculex I® (Dow AgroSciences, Pioneer Hi-Bred International).

Toxins that can be expressed by such transgenic plants include, for example, insecticidal proteins, for example insecticidal proteins from *Bacillus cereus* or *Bacillus popliae*; or insecticidal proteins from *Bacillus thuringiensis*, such as δ-endotoxins, e.g. CryIA(b), CryIA(c), CryIF, CryIF (a2), CryIIA(b), CryIIIA, CryIIIB(b1) or Cry9c, or vegetative insecticidal proteins (VIP), e.g. VIP1, VIP2, VIP3 or VIP3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as *Streptomycetes* toxins, plant lectins, such as pea lectins, barley lectins or snowdrop lectins; agglutinins; proteinase inhibitors, such as trypsine inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In the context of the present invention there are to be understood by 6-endotoxins, for example CryIA(b), CryIA(c), CryIF, CryIF(a2), CryIIA(b), CryIIIA, CryIIIB(b1) or Cry9c, or vegetative insecticidal proteins (VIP), for example VIP1, VIP2, VIP3 or VIP3A, expressly also hybrid toxins, truncated toxins and modified toxins. Hybrid toxins are produced recombinantly by a new combination of different domains of those proteins (see, for example, WO 02/15701). An example for a truncated toxin is a truncated CryIA(b), which is expressed in the Bt11 maize from Syngenta Seed SAS, as described below. In the case of modified toxins, one or more amino acids of the naturally occurring toxin are replaced. In such amino acid replacements, preferably non-naturally present protease recognition sequences are inserted into the toxin, such as, for example, in the case of CryIIIA055, a cathepsin-D-recognition sequence is inserted into a CryIIIA toxin (see WO 03/018810) Examples of such toxins or transgenic plants capable of synthesising such toxins are disclosed, for example, in EP-A-0 374 753, WO 93/07278, WO 95/34656, EP-A-0 427 529, EP-A-451 878 and WO 03/052073.

The processes for the preparation of such transgenic plants are generally known to the person skilled in the art and are described, for example, in the publications mentioned above. CryI-type deoxyribonucleic acids and their preparation are known, for example, from WO 95/34656, EP-A-0 367 474, EP-A-0 401 979 and WO 90/13651.

The toxin contained in the transgenic plants imparts to the plants tolerance to harmful insects. Such insects can occur in any taxonomic group of insects, but are especially commonly found in the beetles (Coleoptera), two-winged insects (Diptera) and butterflies (Lepidoptera).

Transgenic plants containing one or more genes that code for an insecticidal resistance and express one or more toxins are known and some of them are commercially available. Examples of such plants are: YieldGard® (maize variety that expresses a CryIA(b) toxin); YieldGard Rootworm® (maize variety that expresses a CryIIIB(b1) toxin); YieldGard Plus® (maize variety that expresses a CryIA(b) and a CryIIIB(b1) toxin); Starlink® (maize variety that expresses a Cry9(c) toxin); Herculex I® (maize variety that expresses a CryIF(a2) toxin and the enzyme phosphinothricine N-acetyltransferase (PAT) to achieve tolerance to the herbicide glufosinate ammonium); NuCOTN 33B® (cotton variety that expresses a CryIA(c) toxin); Bollgard I® (cotton variety that expresses a CryIA(c) toxin); Bollgard II® (cotton variety that expresses a CryIA(c) and a CryIIA(b) toxin); VIPCOT® (cotton variety that expresses a VIP toxin); NewLeaf® (potato variety that expresses a CryIIIA toxin); Nature-Gard® and Protecta®.

Further examples of such transgenic crops are:
1. Bt11 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and Sesamia nonagrioides) by transgenic expression of a truncated CryIA(b) toxin. Bt11 maize also transgenically expresses the enzyme PAT to achieve tolerance to the herbicide glufosinate ammonium.
2. Bt176 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and Sesamia nonagrioides) by transgenic expression of a CryIA(b) toxin. Bt176 maize also transgenically expresses the enzyme PAT to achieve tolerance to the herbicide glufosinate ammonium.
3. MIR604 Maize from Syngenta Seeds SAS, Chemin de l'Hobit 27, F-31 790 St. Sauveur, France, registration number C/FR/96/05/10. Maize which has been rendered insect-resistant by transgenic expression of a modified CryIIIA toxin. This toxin is Cry3A055 modified by insertion of a cathepsin-D-protease recognition sequence. The preparation of such transgenic maize plants is described in WO 03/018810.
4. MON 863 Maize from Monsanto Europe S.A. 270-272 Avenue de Tervuren, B-1150 Brussels, Belgium, registration number C/DE/02/9. MON 863 expresses a CryIIIB(b1) toxin and has resistance to certain Coleoptera insects.
5. IPC 531 Cotton from Monsanto Europe S.A. 270-272 Avenue de Tervuren, B-1150 Brussels, Belgium, registration number C/ES/96/02.
6. 1507 Maize from Pioneer Overseas Corporation, Avenue Tedesco, 7 B-1160 Brussels, Belgium, registration number C/NL/00/10. Genetically modified maize for the expression of the protein Cry1F for achieving resistance to certain Lepidoptera insects and of the PAT protein for achieving tolerance to the herbicide glufosinate ammonium.
7. NK603×MON 810 Maize from Monsanto Europe S.A. 270-272 Avenue de Tervuren, B-1150 Brussels, Belgium, registration number C/GB/02/M3/03. Consists of conventionally bred hybrid maize varieties by crossing the genetically modified varieties NK603 and MON 810. NK603×MON 810 Maize transgenically expresses the protein CP4 EPSPS, obtained from *Agrobacterium* sp. strain CP4, which imparts tolerance to the herbicide Roundup® (contains glyphosate), and also a CryIA(b) toxin obtained from *Bacillus thuringiensis* subsp. kurstaki which brings about tolerance to certain Lepidoptera, include the European corn borer.

The term "useful plants" is to be understood as including also useful plants which have been so transformed by the use of recombinant DNA techniques that they are capable of synthesising antipathogenic substances having a selective action, such as, for example, the so-called "pathogenesis-related proteins" (PRPs, see e.g. EP-A-0 392 225). Examples of such antipathogenic substances and transgenic plants capable of synthesising such antipathogenic substances are known, for example, from EP-A-0 392 225, WO 95/33818, and EP-A-0 353 191. The methods of producing such transgenic plants are generally known to the person skilled in the art and are described, for example, in the publications mentioned above.

Antipathogenic substances which can be expressed by such transgenic plants include, for example, ion channel blockers, such as blockers for sodium and calcium channels, for example the viral KP1, KP4 or KP6 toxins; stilbene synthases; bibenzyl synthases; chitinases; glucanases; the so-called "pathogenesis-related proteins" (PRPs; see e.g. EP-A-0 392 225); antipathogenic substances produced by microorganisms, for example peptide antibiotics or heterocyclic antibiotics (see e.g. WO 95/33818) or protein or polypeptide factors involved in plant pathogen defence (so-called "plant disease resistance genes", as described in WO 03/000906).

The compositions according to the present invention are particularly effective to control or prevent phytopathogenic diseases, especially powdery mildews, rusts, leaf spot, early blights or molds, caused by certain phytopathogenic fungi on grains, fruits and tree nuts, vegetables, field crops, oil seed crops, forage crops, forest plants, horticulture crops, floriculture, greenhouse and nursery plants, propagative materials, culinary herbs and spices, and medicinal herbs, such as:

*Alternaria solani*, preferably on tomatoes.
*Alternaria alternata*, preferably on aubergines.
*Alternaria porri*, preferably on onions.
*Botrytis cinerea*, preferably on tomatoes, peppers, onions, pomes, stone fruits, kiwi, blueberry, sugar beet or grapes.
*Botrytis allii*, preferably on onions.
*Botrytis squamosa*, preferably on onions.
*Cercospora capsici*, preferably on peppers.
*Corynespora cassiicola*, preferably on tomatoes.
*Guignardia bidwellii*, preferably on grapes.
*Monilinia fructicola*, preferably on cherries, peaches, plums, prunes, nectarines or almonds.
*Monilinia fructigena*, preferably on cherries, peaches, plums, prunes, nectarines or almonds.
*Monilinia laxa*, preferably on cherries, peaches, plums, prunes, nectarines or almonds.
*Phomopsis viticola*, preferably on grapes.
*Podosphaera leucotricha*, preferably on apples.
*Podosphaera xanthii*, preferably on cucurbits.
*Pseudopezicula tracheiphila*, preferably on grapes.
*Uncinula necator*, preferably on grapes.
*Venturia inaequalis*, preferably on apples.

The compositions according to the present invention are furthermore particularly effective against seedborne and soilborne diseases, such as *Alternaria* spp., *Ascochyta* spp., *Botrytis cinerea*, *Cercospora* spp., *Claviceps purpurea*, *Cochliobolus sativus*, *Colletotrichum* spp., *Epicoccum* spp., *Fusarium graminearum*, *Fusarium moniliforme*, *Fusarium oxysporum*, *Fusarium proliferatum*, *Fusarium solani*, *Fusarium subglutinans*, *Gaumannomyces graminis*, *Helminthosporium* spp., *Microdochium nivale*, *Phoma* spp., *Pyrenophora graminea*, *Pyricularia oryzae*, *Rhizoctonia solani*, *Rhizoctonia cerealis*, *Sclerotinia* spp., *Septoria* spp., *Sphacelotheca reilliana*, *Tilletia* spp., *Typhula incarnata*, *Urocystis occulta*, *Ustilago* spp. or *Verticillium* spp.; in particular against pathogens of cereals, such as wheat, barley, rye or oats; maize; rice; cotton; soybean; turf; sugarbeet; oil seed rape; potatoes; pulse crops, such as peas, lentils or chickpea; and sunflower.

The compositions according to the present invention are furthermore particularly effective against post harvest diseases such as *Botrytis cinerea*, *Colletotrichum musae*, *Curvularia lunata*, *Fusarium semitecum*, *Geotrichum candidum*, *Monilinia fructicola*, *Monilinia fructigena*, *Monilinia laxa*, *Mucor piriformis*, *Penicilium italicum*, *Penicilium solitum*, *Penicillium digitatum* or *Penicillium expansum* in particular against pathogens of fruits, such as pomefruits, for example apples and pears, stone fruits, for example peaches and plums, citrus, melons, papaya, kiwi, mango, berries, for example strawberries, avocados, pomegranates and bananas, and nuts.

The compositions of the present invention may also be used in crop enhancement. According to the present invention, "crop enhancement" means an improvement in plant vigour, an improvement in plant quality, improved tolerance to stress factors, and/or improved input use efficiency.

According to the present invention, an "improvement in plant vigour" means that certain traits are improved qualitatively or quantitatively when compared with the same trait in a control plant which has been grown under the same conditions in the absence of the method of the invention. Such traits include, but are not limited to, early and/or improved germination, improved emergence, the ability to use less seeds, increased root growth, a more developed root system, increased root nodulation, increased shoot growth, increased tillering, stronger tillers, more productive tillers, increased or improved plant stand, less plant verse (lodging), an increase and/or improvement in plant height, an increase in plant weight (fresh or dry), bigger leaf blades, greener leaf colour, increased pigment content, increased photosynthetic activity, earlier flowering, longer panicles, early grain maturity, increased seed, fruit or pod size, increased pod or ear number, increased seed number per pod or ear, increased seed mass, enhanced seed filling, less dead basal leaves, delay of senescence, improved vitality of the plant, increased levels of amino acids in storage tissues and/or less inputs needed (e.g. less fertiliser, water and/or labour needed). A plant with improved vigour may have an increase in any of the aforementioned traits or any combination or two or more of the aforementioned traits.

According to the present invention, an "improvement in plant quality" means that certain traits are improved qualitatively or quantitatively when compared with the same trait in a control plant which has been grown under the same conditions in the absence of the method of the invention. Such traits include, but are not limited to, improved visual appearance of the plant, reduced ethylene (reduced production and/or inhibition of reception), improved quality of harvested material, e.g. seeds, fruits, leaves, vegetables (such improved quality may manifest as improved visual appearance of the harvested material), improved carbohydrate content (e.g. increased quantities of sugar and/or starch, improved sugar acid ratio, reduction of reducing sugars, increased rate of development of sugar), improved protein content, improved oil content and composition, improved nutritional value, reduction in anti-nutritional compounds, improved organoleptic properties (e.g. improved taste) and/or improved consumer health benefits (e.g. increased levels of vitamins and anti-oxidants)), improved post-harvest characteristics (e.g. enhanced shelf-life and/or storage stability, easier processability, easier extraction of compounds), more homogenous crop development (e.g. synchronised germination, flowering and/or fruiting of plants), and/or improved seed quality (e.g. for use in following seasons). A plant with improved quality may have an increase in any of the aforementioned traits or any combination or two or more of the aforementioned traits.

According to the present invention, an "improved tolerance to stress factors" means that certain traits are improved qualitatively or quantitatively when compared with the same trait in a control plant which has been grown under the same conditions in the absence of the method of the invention. Such traits include, but are not limited to, an increased tolerance and/or resistance to abiotic stress factors which cause sub-optimal growing conditions such as drought (e.g. any stress which leads to a lack of water content in plants, a lack of water uptake potential or a reduction in the water supply to plants), cold exposure, heat exposure, osmotic stress, UV stress, flooding, increased salinity (e.g. in the soil), increased mineral exposure, ozone exposure, high light exposure and/or limited availability of nutrients (e.g. nitrogen and/or phosphorus nutrients). A plant with improved tolerance to stress factors may have an increase in any of the aforementioned traits or any combination or two or more of the aforementioned traits. In the case of drought and nutrient stress, such improved tolerances may be due to, for example, more efficient uptake, use or retention of water and nutrients.

According to the present invention, an "improved input use efficiency" means that the plants are able to grow more effectively using given levels of inputs compared to the grown of control plants which are grown under the same conditions in the absence of the method of the invention. In particular, the inputs include, but are not limited to fertiliser (such as nitrogen, phosphorous, potassium, micronutrients), light and water. A plant with improved input use efficiency may have an improved use of any of the aforementioned inputs or any combination of two or more of the aforementioned inputs.

Other crop enhancements of the present invention include a decrease in plant height, or reduction in tillering, which are beneficial features in crops or conditions where it is desirable to have less biomass and fewer tillers.

Any or all of the above crop enhancements may lead to an improved yield by improving e.g. plant physiology, plant growth and development and/or plant architecture. In the context of the present invention 'yield' includes, but is not limited to, (i) an increase in biomass production, grain yield, starch content, oil content and/or protein content, which may result from (a) an increase in the amount produced by the plant per se or (b) an improved ability to harvest plant matter, (ii) an improvement in the composition of the harvested material (e.g. improved sugar acid ratios, improved oil composition, increased nutritional value, reduction of anti-nutritional compounds, increased consumer health benefits) and/or (iii) an increased/facilitated ability to harvest the crop, improved processability of the crop and/or better storage stability/shelf life. Increased yield of an agricultural plant means that, where it is possible to take a quantitative measurement, the yield of a product of the respective plant is increased by a measurable amount over the yield of the same product of the plant produced under the same conditions, but without application of the present invention. According to the present invention, it is preferred that the yield be increased by at least 0.5%, more preferred at least 1%, even more preferred at least 2%, still more preferred at least 4%, preferably 5% or even more.

Any or all of the above crop enhancements may also lead to an improved utilisation of land, i.e. land which was previously unavailable or sub-optimal for cultivation may become available. For example, plants which show an increased ability to survive in drought conditions, may be able to be cultivated in areas of sub-optimal rainfall, e.g. perhaps on the fringe of a desert or even the desert itself.

In one aspect of the present invention, crop enhancements are made in the substantial absence of pressure from pests and/or diseases and/or abiotic stress. In a further aspect of the present invention, improvements in plant vigour, stress tolerance, quality and/or yield are made in the substantial absence of pressure from pests and/or diseases. For example, pests and/or diseases may be controlled by a pesticidal treatment that is applied prior to, or at the same time as, the method of the present invention. In a still further aspect of the present invention, improvements in plant vigour, stress tolerance, quality and/or yield are made in the absence of pest and/or disease pressure. In a further embodiment, improvements in plant vigour, quality and/or yield are made in the absence, or substantial absence, of abiotic stress.

The compositions of the present invention may also be used in the field of protecting storage goods against attack of fungi. According to the present invention, the term "storage goods" is understood to denote natural substances of vegetable and/or animal origin and their processed forms, which have been taken from the natural life cycle and for which long-term protection is desired. Storage goods of vegetable origin, such as plants or parts thereof, for example stalks, leafs, tubers, seeds, fruits or grains, can be protected in the freshly harvested state or in processed form, such as pre-dried, moistened, comminuted, ground, pressed or roasted. Also falling under the definition of storage goods is timber, whether in the form of crude timber, such as construction timber, electricity pylons and barriers, or in the form of finished articles, such as furniture or objects made from wood. Storage goods of animal origin are hides, leather, furs, hairs and the like. The composition according the present invention can prevent disadvantageous effects such as decay, discoloration or mold. Preferably "storage goods" is understood to denote natural substances of vegetable origin and/or their processed forms, more preferably fruits and their processed forms, such as pomes, stone fruits, soft fruits and citrus fruits and their processed forms. In another preferred embodiment of the invention "storage goods" is understood to denote wood.

Therefore, a further aspect of the present invention is a method of protecting storage goods, which comprises applying to the storage goods a composition according to the invention.

The composition of the present invention may also be used in the field of protecting technical material against attack of fungi. According to the present invention, the term "technical material" includes paper; carpets; constructions; cooling and heating systems; wall-boards; ventilation and air conditioning systems and the like; preferably "technical material" is understood to denote wall-boards. The composition according the present invention can prevent disadvantageous effects such as decay, discoloration or mold.

Some compositions according to the invention have a systemic action and can be used as foliar, soil and seed treatment fungicides.

With the compositions according to the invention it is possible to inhibit or destroy the phytopathogenic microorganisms which occur in plants or in parts of plants (fruit, blossoms, leaves, stems, tubers, roots) in different useful plants, while at the same time the parts of plants which grow later are also protected from attack by phytopathogenic microorganisms.

The compositions according to the invention can be applied to the phytopathogenic microorganisms, the useful plants, the locus thereof, the propagation material thereof, storage goods or technical materials threatened by microorganism attack.

The compositions according to the invention may be applied before or after infection of the useful plants, the propagation material thereof, storage goods or technical materials by the microorganisms.

The compositions of the present invention may also be used in the field of protecting industrial material against attack of fungi. According to the instant invention, the term "industrial material" denotes non-live material which have been prepared for use in industry. For example, industrial materials which are intended to be protected against attack of fungi can be glues, sizes, paper, board, textiles, carpets, leather, wood, constructions, paints, plastic articles, cooling lubricants, aquaeous hydraulic fluids and other materials which can be infested with, or decomposed by, microorganisms. Cooling and heating systems, ventilation and air conditioning systems and parts of production plants, for example cooling-water circuits, which may be impaired by multiplication of microorganisms may also be mentioned from amongst the materials to be protected. The compositions according the present invention can prevent disadvantageous effects such as decay, discoloration or mold.

The amount of a combination of the invention to be applied, will depend on various factors, such as the compounds employed; the subject of the treatment, such as, for example plants, soil or seeds; the type of treatment, such as, for example spraying, dusting or seed dressing; the purpose of the treatment, such as, for example prophylactic or therapeutic; the type of fungi to be controlled or the application time.

The compositions comprising component (A) in combination with component (B) can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compound of component (A) and the active ingredient of component (B) is not essential for working the present invention.

The compositions according to the invention are preventively and/or curatively valuable active ingredients in the field of pest control, even at low rates of application.

When applied to the useful plants, the component (A) is applied at a rate of from 25 g a.i./ha to 500 g a.i./ha in association with 10 g a.i./ha to 500 g a.i./ha of component (B). In another embodiment of the invention, when applied to the useful plants, the component (A) is applied at a rate of from 25 g a.i./ha to 500 g a.i./ha in association with 25 g a.i./ha to 500 g a.i./ha of component (B). In another embodiment of the invention, when applied to the useful plants, the component (A) is applied at a rate of from 25 g a.i./ha to 200 g a.i./ha in association with 25 g a.i./ha to 200 g a.i./ha of component (B).

In a preferred embodiment of the invention, the method of controlling or preventing phytopathogenic diseases, especially phytopathogenic fungi, on useful plants or on propagation material thereof, comprises applying to the useful plants, the locus thereof or propagation material thereof a composition as defined according to the invention, wherein the component (A) is applied at a rate of from 25 g a.i./ha to 500 g a.i./ha in association with 10 g a.i./ha to 500 g a.i./ha of component (B).

In another embodiment of the invention, the method of controlling or preventing phytopathogenic diseases, especially phytopathogenic fungi, on useful plants or on propagation material thereof, comprises applying to the useful plants, the locus thereof or propagation material thereof a composition as defined according to the invention, wherein the component (A) is applied at a rate of from 25 g a.i./ha to 500 g a.i./ha in association with 25 g a.i./ha to 500 g a.i./ha of component (B).

In another embodiment of the invention, the method of controlling or preventing phytopathogenic diseases, especially phytopathogenic fungi, on useful plants or on propagation material thereof, comprises applying to the useful plants, the locus thereof or propagation material thereof a composition as defined according to the invention, wherein the component (A) is applied at a rate of from 25 g a.i./ha to 200 g a.i./ha in association with 25 g a.i./ha to 200 g a.i./ha of component (B).

The method of controlling or preventing phytopathogenic diseases according to the invention may be particularly effective against phytopathogenic fungi selected from the group consisting of *Alternaria, Botrytis, Cercospora, Colletotrichum, Corynespora, Guignardia, Mycosphaerella, Monilinia, Penicillium, Phakopsora, Phomopsis, Podosphaera, Pseudopezicula, Septoria, Uncinula* and *Venturia*.

The method of controlling or preventing phytopathogenic diseases according to the invention may be effective especially against phytopathogenic fungi selected from the group consisting of *Alternaria solani, Alternaria alternata, Alternaria porri, Botrytis cinerea, Botrytis allii, Botrytis squamosa, Cercospora capsici, Colletotrichum lagenarium, Corynespora cassiicola, Guignardia bidwellii, Monilinia fructicola, Monilinia fructigena, Monilinia laxa, Penicillium digitatum, Penicillium italicum, Penicillium expansum, Phomopsis viticola, Podosphaera leucotricha, Podosphaera xanthii, Pseudopezicula tracheiphila, Septoria tritici, Uncinula necator* and *Venturia inaequalis*.

Preferred is a method of controlling or preventing phytopathogenic diseases, especially phytopathogenic fungi, which comprises applying a composition according to the invention to useful plants selected from the group consisting of grains, fruits and tree nuts, vegetables, field crops, oil seed crops, forage crops, forest plants, horticulture crops, floriculture, greenhouse and nursery plants, propagative materials, culinary herbs and spices, and medicinal herbs.

More preferred is a method of controlling or preventing phytopathogenic diseases, especially phytopathogenic fungi, which comprises applying a composition according to the invention to useful plants selected from the group consisting of wheat, barley, rice, soybean, apples, almonds, cherries, raspberries, grapes, cucumbers, peanuts, tomatoes, strawberries, citrus and bananas.

The invention also provides fungicidal compositions comprising a combination of components (A) and (B) as mentioned above in a synergistically effective amount, together with an agriculturally acceptable carrier and, optionally, a surfactant. In said compositions, the weight ratio of (A) to (B) is preferably from 100:1 to 1:1000, more preferably from 100:1 to 1:500, even more preferably from 50:1 to 1:200, still more preferably from 50:1 to 1:20 as described hereinbefore.

The compositions of the invention may be employed in any conventional form, for example in the form of a twin pack, a powder for dry seed treatment (DS), an emulsion for seed treatment (ES), a flowable concentrate for seed treatment (FS), a solution for seed treatment (LS), a water dispersible powder for seed treatment (WS), a capsule suspension for seed treatment (CF), a gel for seed treatment (GF), an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP) or any technically feasible formulation in combination with agriculturally acceptable adjuvants.

Such compositions may be produced in conventional manner, e.g. by mixing the active ingredients with appropriate formulation inerts (diluents, solvents, fillers and optionally other formulating ingredients). Also, conventional slow release formulations may be employed where long lasting efficacy is intended. Particularly, formulations to be applied in spraying forms, such as water dispersible concentrates (e.g. EC, SC, DC, OD, SE, EW, EO and the like), wettable powders and granules, may contain compounds that provide adjuvancy effects. In some embodiments, the compositions of the invention may be produced by mixing a fermentation broth comprising Aureobasidin A and one or more other cyclic depsipeptides of formula (I-A) or stereoisomers thereof with component (B). In some other embodiments, the compositions of the invention may be produced by mixing a fermentation broth comprising Persephacin A and one or more other cyclic depsipeptides of formula (I-B) or stereoisomers thereof with component (B).

A seed dressing formulation is applied in a manner known per se to the seeds employing the combination of the invention and a diluent in suitable seed dressing formulation form, e.g. as an aqueous suspension or in a dry powder form having good adherence to the seeds. Such seed dressing formulations are known in the art. Seed dressing formulations may contain the single active ingredients or the combination of active ingredients in encapsulated form, e.g. as slow release capsules or microcapsules.

In general, the formulations include from 0.01 to 90% by weight of active agent, from 0 to 20% agriculturally acceptable surfactant and 10 to 99.99% solid or liquid formulation inerts and adjuvant(s), the active agent consisting of at least the compound of formula (I) together with component (B) and, optionally, component (C) and other active agents, particularly microbiocides or conservatives or the like. Concentrated forms of compositions generally contain in between about 2 and 80%, preferably between about 5 and 70% by weight of active agent. Application forms of formulation may for example contain from 0.01 to 20% by weight, preferably from 0.01 to 5% by weight of active agent. Whereas commercial products will preferably be formulated as concentrates, the end user will normally employ diluted formulations.

It has been found, surprisingly, that certain weight ratios of component (A) to component (B) are able to give rise to synergistic activity. Therefore, a further aspect of the invention are compositions, wherein component (A) and component (B) are present in the composition in amounts producing a synergistic effect. This synergistic activity is apparent from the fact that the fungicidal activity of the composition comprising component (A) and component (B) is greater than the sum of the fungicidal activities of component (A) and component (B). This synergistic activity extends the range of action of component (A) and component (B) in two ways. Firstly, the rates of application of component (A) and component (B) are lowered whilst the action remains equally good, meaning that the active ingredient mixture still achieves a high degree of phytopathogen control even where the two individual components have become totally ineffective in such a low application rate range. Secondly, there is a substantial broadening of the spectrum of phytopathogens that can be controlled.

A synergistic effect exists whenever the action of an active ingredient combination is greater than the sum of the actions of the individual components. The action to be expected E for a given active ingredient combination obeys the so-called COLBY formula and can be calculated as follows (COLBY, S. R. "Calculating synergistic and antagonistic responses of herbicide combination", Weeds, Vol. 15, pages 20-22; 1967):

ppm=milligrams of active ingredient (=a.i.) per liter of spray mixture,

X=% action by active ingredient (A) using p ppm of active ingredient,

Y=% action by active ingredient (B) using q ppm of active ingredient.

According to COLBY, the expected (additive) action of active ingredients (A)+(B) using p+q ppm of active ingredient is $$E = X + Y - \frac{X \cdot Y}{100}$$

If the action actually observed (O) is greater than the expected action (E), then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

However, besides the actual synergistic action with respect to fungicidal activity, the compositions according to the invention can also have further surprising advantageous properties. Examples of such advantageous properties that may be mentioned are: more advantageous degradability; improved toxicological and/or ecotoxicological behaviour; or improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigor, and early germination.

The Examples which follow serve to illustrate the invention and are not meant in any way to limit the invention.

BIOLOGICAL EXAMPLES

The compositions according to the invention are tested for their biological (fungicidal) activity using application rates wherein the component (A) is applied at a rate of from 25 g a.i./ha to 500 g a.i./ha in association with 10 g a.i./ha to 500 g a.i./ha of component (B).

The compositions according to the invention are tested for their biological (fungicidal) activity as dimethylsulfoxide (DMSO) solutions using one or more of the following protocols (Examples 1-1 and 1-2). A standard description of the liquid culture tests is provided in Example 1.

Aureobasidin A and its synthesis are known from Takesako et al., *The Journal of Antibiotics*, 1991, 44, 919-924. Aureobasidin A is separated from the fermentation broth by extraction with ethyl acetate, followed by extraction of the ethyl acetate concentrate with a mixture of MeOH:H$_2$O (80% by volume) and cyclohexane (20% by volume), and purified by silica gel column chromatography (silica-gel, elution with hexane:ethyl acetate) followed by reverse phase column chromatography (RP18, elution with acetonitrile:H$_2$O). As already indicated, components (B) of the compositions are known and are commercially available and/or can be prepared using procedures known in the art and/or procedures reported in the literature.

Example 1: Liquid Culture Tests in Well Plates

Mycelia fragments or conidia suspensions of a fungus, prepared either freshly from liquid cultures of the fungus or from cryogenic storage, are directly mixed into nutrient broth. DMSO solutions of the test compound (max. 10 mg/mL) is diluted with 0.025% Tween20 by factor 50 and 10 µL of this solution is pipetted into a microtiter plate (96-well format). The nutrient broth containing the fungal spores/mycelia fragments is then added to give an end concentration of the tested compound. The test plates are incubated in the dark at 24° C. and 96% relative humidity (rh). The inhibition of fungal growth is determined photometrically and visually after 3-7 days, depending on the pathosystem, and percent antifungal activity relative to the untreated check is calculated.

Example 1-1: *Botrytis cinerea* (Gray Mould)

Conidia of the fungus from cryogenic storage were directly mixed into nutrient broth (PDB potato dextrose broth). After placing a DMSO solution of the test compositions into a microtiter plate (96-well format), the nutrient broth containing the fungal spores was added. The test plates were incubated at 24° C. and the inhibition of growth was determined photometrically after 72 hours.

Example 1-2: *Alternaria solani* (Early Blight of Tomato/Potato)

Conidia of the fungus from cryogenic storage were directly mixed into nutrient broth (PDB potato dextrose broth). After placing a DMSO solution of the test compositions into a microtiter plate (96-well format) the nutrient broth containing the fungal spores was added. The test plates were incubated at 24° C. and the inhibition of growth was determined photometrically after 48 hours.

Results

Results from the tests outlined above are shown below in Tables 1 to 18. These data show that synergistic fungicidal activity is observed for the combination of Aureobasidin A and another active ingredient of component (B) against *Botrytis cinerea* and *Alternaria solani* at certain weight ratios. According to COLBY, in mathematical terms the synergism factor SF corresponds to O/E. In the agricultural practice an SF of 1.1 indicates significant improvement over the purely complementary addition of activities (expected activity), while an SF of <0.9 in the practical application routine signals a loss of activity compared to the expected activity.

TABLE 1

Fungicidal activity of a composition of Aureobasidin A and quinofumelint (B-1) agains *Botrytis cinerea* as described in Example 1-1 above.

| Aureobasidin A (A) (ppm) | (B-1) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0050 | | | 18 | | | |
| 0.0100 | | | 27 | | | |
| 0.0200 | | | 27 | | | |
| | 0.0003 | | | 27 | | |
| | 0.0005 | | | 37 | | |
| | 0.0010 | | | 52 | | |
| 0.0050 | 0.0003 | 20:1 | | | 40 | 45 |
| 0.0100 | 0.0005 | 20:1 | | | 54 | 63 |
| 0.0200 | 0.0010 | 20:1 | | | 65 | 74 |

TABLE 2

Fungicidal activity of a composition of Aureobasidin A and quinofumelin (B-1) against *Alternaria solani* as described in Example 1-2 above.

| Aureobasidin A (A) (ppm) | (B-1) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0200 | | | 32 | | | |
| | 0.0010 | | | 0 | | |
| 0.0200 | 0.0010 | 20:1 | | | 32 | 43 |

TABLE 3

Fungicidal activity of a composition of Aureobasidin A and N-[(1R)-1-benzyl-1,3-dimethyl-butyl]-8-fluoro-quinoline-3-carboxamide/N-[(1S)-1-benzyl-1,3-dimethyl-butyl]-8-fluoro-quinoline-3-carboxamide (B-2) against *Botrytis cinerea* as described in Example 1-1 above.

| Aureobasidin A (A) (ppm) | (B-2) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0025 | | | 7 | | | |
| 0.0050 | | | 1 | | | |
| | 0.0003 | | | 2 | | |
| | 0.0006 | | | 35 | | |
| | 0.0050 | | | 70 | | |
| 0.0025 | 0.0003 | 8:1 | | | 9 | 45 |
| 0.0025 | 0.0050 | 1:2 | | | 72 | 80 |
| 0.0050 | 0.0006 | 8:1 | | | 36 | 60 |

TABLE 4

Fungicidal activity of a composition of Aureobasidin A and N-[(1R)-1-benzyl-1,3-dimethyl-butyl]-8-fluoro-quinoline-3-carboxamide/N-[(1S)-1-benzyl-1,3-dimethyl-butyl]-8-fluoro-quinoline-3-carboxamide (B-2) against *Alternaria solani* as described in Example 1-2 above.

| Aureobasidin A (A) (ppm) | (B-2) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0100 | | | 17 | | | |
| 0.0200 | | | 17 | | | |
| 0.0400 | | | 36 | | | |
| | 0.0025 | | | 0 | | |
| | 0.0050 | | | 10 | | |
| | 0.0100 | | | 52 | | |
| 0.0100 | 0.0100 | 1:1 | | | 61 | 69 |
| 0.0200 | 0.0025 | 8:1 | | | 17 | 49 |
| 0.0200 | 0.0050 | 4:1 | | | 25 | 51 |
| 0.0400 | 0.0050 | 8:1 | | | 42 | 60 |

TABLE 5

Fungicidal activity of a composition of Aureobasidin A and N-[(1R)-1-benzyl-3,3,3-trifluoro-1-methyl-propyl]-8-fluoro-quinoline-3-carboxamide/N-[(1S)-1-benzyl-3,3,3-trifluoro-1-methyl-propyl]-8-fluoro-quinoline-3-carboxamide (B-3) against *Botrytis cinerea* as described in Example 1-1 above.

| Aureobasidin A (A) (ppm) | (B-3) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0050 | | | 20 | | | |
| 0.0100 | | | 22 | | | |
| | 0.0006 | | | 10 | | |
| | 0.0012 | | | 32 | | |
| | 0.0050 | | | 52 | | |
| 0.0050 | 0.0006 | 8:1 | | | 29 | 41 |
| 0.0100 | 0.0012 | 8:1 | | | 47 | 63 |
| 0.0100 | 0.0050 | 2:1 | | | 63 | 70 |

TABLE 6

Fungicidal activity of a composition of Aureobasidin A and N-[(1R)-1-benzyl-3-chloro-1-methyl-but-3-enyl]-8-fluoro-quinoline-3-carboxamide/N-[(1S)-1-benzyl-3-chloro-1-methyl-but-3-enyl]-8-fluoro-quinoline-3-carboxamide (B-4) against *Botrytis cinerea* as described in Example 1-1 above.

| Aureobasidin A (A) (ppm) | (B-4) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0050 | | | 18 | | | |
| 0.0100 | | | 18 | | | |
| 0.0200 | | | 29 | | | |
| | 0.0006 | | | 33 | | |
| | 0.0012 | | | 46 | | |
| | 0.0025 | | | 60 | | |
| 0.0050 | 0.0006 | 8:1 | | | 45 | 53 |
| 0.0100 | 0.0012 | 8:1 | | | 56 | 73 |
| 0.0200 | 0.0025 | 8:1 | | | 72 | 82 |

TABLE 7

Fungicidal activity of a composition of Aureobasidin A and N-[(1R)-1-benzyl-3-chloro-1-methyl-but-3-enyl]-8-fluoro-quinoline-3-carboxamide/N-[(1S)-1-benzyl-3-chloro-1-methyl-but-3-enyl]-8-fluoro-quinoline-3-carboxamide (B-4) against *Alternaria solani* as described in Example 1-2 above.

| Aureobasidin A (A) (ppm) | (B-4) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0050 | | | 5 | | | |
| | 0.0050 | | | 32 | | |
| 0.0050 | 0.0050 | 1:1 | | | 36 | 41 |

TABLE 8

Fungicidal activity of a composition of Aureobasidin A and 1-(6,7-dimethylpyrazolo[1,5-a]pyridin-3-yl)-4,4,5-trifluoro-3,3-dimethyl-isoquinoline (B-5) against *Botrytis cinerea* as described in Example 1-1 above.

| Aureobasidin A (A) (ppm) | (B-5) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0003 | | | 9 | | | |
| 0.0006 | | | 0 | | | |
| 0.0012 | | | 9 | | | |
| 0.0025 | | | 0 | | | |
| 0.0050 | | | 29 | | | |
| 0.0100 | | | 28 | | | |
| 0.0200 | | | 29 | | | |
| | 0.0006 | | | 17 | | |
| | 0.0012 | | | 40 | | |
| | 0.0025 | | | 57 | | |
| | 0.0050 | | | 75 | | |
| 0.0003 | 0.0006 | 1:2 | | | 24 | 40 |
| 0.0006 | 0.0012 | 1:2 | | | 40 | 53 |
| 0.0012 | 0.0025 | 1:2 | | | 61 | 72 |
| 0.0025 | 0.0012 | 2:1 | | | 40 | 46 |
| 0.0025 | 0.0025 | 1:1 | | | 57 | 68 |
| 0.0025 | 0.0050 | 1:2 | | | 75 | 84 |
| 0.0050 | 0.0006 | 8:1 | | | 41 | 48 |
| 0.0100 | 0.0012 | 8:1 | | | 56 | 67 |
| 0.0200 | 0.0025 | 8:1 | | | 69 | 77 |

TABLE 9

Fungicidal activity of a composition of Aureobasidin A and 1-(6,7-dimethylpyrazolo[1,5-a]pyridin-3-yl)-4,4,5-trifluoro-3,3-dimethyl-isoquinoline (B-5) against *Alternaria solani* as described in Example 1-2 above.

| Aureobasidin A (A) (ppm) | (B-5) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0012 | | | 0 | | | |
| 0.0025 | | | 11 | | | |
| 0.0100 | | | 14 | | | |
| 0.0200 | | | 14 | | | |
| | 0.0012 | | | 30 | | |
| | 0.0025 | | | 56 | | |
| 0.0012 | 0.0025 | 1:2 | | | 56 | 70 |
| 0.0025 | 0.0025 | 1:1 | | | 61 | 69 |
| 0.0100 | 0.0012 | 8:1 | | | 39 | 50 |
| 0.0200 | 0.0025 | 8:1 | | | 62 | 78 |

TABLE 10

Fungicidal activity of a composition of Aureobasidin A and 1-(6,7-dimethylpyrazolo[1,5-a]pyridin-3-yl)-4,4,6-trifluoro-3,3-dimethyl-isoquinoline (B-6) against *Botrytis cinerea* as described in Example 1-1 above.

| Aureobasidin A (A) (ppm) | (B-6) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0001 | | | 0 | | | |
| 0.0002 | | | 0 | | | |
| 0.0003 | | | 0 | | | |
| 0.0006 | | | 9 | | | |
| 0.0012 | | | 0 | | | |
| 0.0025 | | | 12 | | | |
| 0.0050 | | | 12 | | | |
| | 0.0006 | | | 25 | | |
| | 0.0012 | | | 34 | | |
| | 0.0025 | | | 68 | | |
| | 0.0050 | | | 84 | | |
| 0.0001 | 0.0006 | 1:8 | | | 25 | 70 |
| 0.0002 | 0.0006 | 1:4 | | | 25 | 49 |
| 0.0002 | 0.0012 | 1:8 | | | 34 | 85 |
| 0.0003 | 0.0012 | 1:4 | | | 34 | 66 |
| 0.0003 | 0.0025 | 1:8 | | | 68 | 92 |
| 0.0006 | 0.0006 | 1:1 | | | 32 | 40 |
| 0.0006 | 0.0012 | 1:2 | | | 40 | 48 |
| 0.0006 | 0.0025 | 1:4 | | | 71 | 80 |
| 0.0006 | 0.0050 | 1:8 | | | 86 | 97 |
| 0.0012 | 0.0006 | 2:1 | | | 25 | 47 |
| 0.0012 | 0.0012 | 1:1 | | | 34 | 63 |
| 0.0025 | 0.0012 | 2:1 | | | 42 | 62 |
| 0.0025 | 0.0025 | 1:1 | | | 72 | 86 |
| 0.0050 | 0.0025 | 2:1 | | | 72 | 80 |

TABLE 11

Fungicidal activity of a composition of Aureobasidin A and 1-(6,7-dimethylpyrazolo[1,5-a]pyridin-3-yl)-4,4,6-trifluoro-3,3-dimethyl-isoquinoline (B-6) against *Alternaria solani* as described in Example 1-2 above.

| Aureobasidin A (A) (ppm) | (B-6) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0001 | | | 9 | | | |
| 0.0002 | | | 0 | | | |
| 0.0003 | | | 8 | | | |
| 0.0006 | | | 11 | | | |
| 0.0025 | | | 20 | | | |
| | 0.0006 | | | 22 | | |
| | 0.0012 | | | 39 | | |
| | 0.0025 | | | 59 | | |
| 0.0001 | 0.0006 | 1:8 | | | 29 | 64 |
| 0.0002 | 0.0006 | 1:4 | | | 22 | 42 |
| 0.0002 | 0.0012 | 1:8 | | | 39 | 82 |
| 0.0003 | 0.0012 | 1:4 | | | 44 | 64 |
| 0.0003 | 0.0025 | 1:8 | | | 63 | 88 |
| 0.0006 | 0.0025 | 1:4 | | | 64 | 83 |
| 0.0025 | 0.0012 | 2:1 | | | 51 | 59 |

TABLE 12

Fungicidal activity of a composition of Aureobasidin A and 4,4-difluoro-3,3-dimethyl-1-(7-methylpyrazolo[1,5-a]pyridin-3-yl)isoquinoline (B-7) against *Botrytis cinerea* as described in Example 1-1 above.

| Aureobasidin A (A) (ppm) | (B-7) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0001 | | | 0 | | | |
| 0.0002 | | | 5 | | | |
| 0.0003 | | | 1 | | | |
| 0.0006 | | | 6 | | | |
| 0.0025 | | | 0 | | | |
| | 0.0006 | | | 18 | | |
| | 0.0012 | | | 40 | | |
| 0.0001 | 0.0006 | 1:8 | | | 18 | 47 |
| 0.0002 | 0.0012 | 1:8 | | | 42 | 58 |
| 0.0003 | 0.0012 | 1:4 | | | 40 | 47 |
| 0.0006 | 0.0012 | 1:2 | | | 43 | 52 |
| 0.0025 | 0.0012 | 2:1 | | | 40 | 53 |

TABLE 13

Fungicidal activity of a composition of Aureobasidin A and 4,4-difluoro-3,3-dimethyl-1-(7-methylpyrazolo[1,5-a]pyridin-3-yl)isoquinoline (B-7) against *Alternaria solani* as described in Example 1-2 above.

| Aureobasidin A (A) (ppm) | (B-7) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0025 | | | 0 | | | |
| | 0.0100 | | | 63 | | |
| 0.0025 | 0.0100 | 1:4 | | | 63 | 73 |

TABLE 14

Fungicidal activity of a composition of Aureobasidin A and 1-(4,5-dimethylbenzimidazol-1-yl)-4,4,5-trifluoro-3,3-dimethyl-isoquinoline (B-8) against *Botrytis cinerea* as described in Example 1-1 above.

| Aureobasidin A (A) (ppm) | (B-8) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0025 | | | 3 | | | |
| 0.0050 | | | 13 | | | |
| 0.0100 | | | 19 | | | |
| | 0.0003 | | | 22 | | |
| | 0.0006 | | | 40 | | |
| | 0.0012 | | | 50 | | |
| 0.0025 | 0.0003 | 8:1 | | | 24 | 44 |
| 0.0025 | 0.0006 | 4:1 | | | 42 | 50 |
| 0.0050 | 0.0006 | 8:1 | | | 48 | 63 |
| 0.0100 | 0.0012 | 8:1 | | | 59 | 71 |

TABLE 15

Fungicidal activity of a composition of Aureobasidin A and 1-(4,5-dimethylbenzimidazol-1-yl)-4,4,5-trifluoro-3,3-dimethyl-isoquinoline (B-8) against *Alternaria solani* as described in Example 1-2 above.

| Aureobasidin A (A) (ppm) | (B-8) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0006 | | | 0 | | | |
| 0.0050 | | | 3 | | | |
| 0.0100 | | | 27 | | | |
| | 0.0012 | | | 38 | | |
| 0.0006 | 0.0012 | 1:2 | | | 38 | 49 |
| 0.0050 | 0.0012 | 4:1 | | | 40 | 51 |
| 0.0100 | 0.0012 | 8:1 | | | 55 | 61 |

TABLE 16

Fungicidal activity of a composition of Aureobasidin A and 1-(4,5-dimethylbenzimidazol-1-yl)-4,4-difluoro-3,3-dimethyl-isoquinoline (B-9) against *Botrytis cinerea* as described in Example 1-1 above.

| Aureobasidin A (A) (ppm) | (B-9) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0006 | | | 9 | | | |
| 0.0025 | | | 9 | | | |
| 0.0050 | | | 9 | | | |
| 0.0100 | | | 27 | | | |
| | 0.0003 | | | 9 | | |
| | 0.0006 | | | 28 | | |
| | 0.0012 | | | 45 | | |
| 0.0006 | 0.0006 | 1:1 | | | 34 | 41 |
| 0.0025 | 0.0003 | 8:1 | | | 17 | 42 |
| 0.0025 | 0.0006 | 4:1 | | | 34 | 48 |
| 0.0050 | 0.0006 | 8:1 | | | 34 | 60 |
| 0.0050 | 0.0012 | 4:1 | | | 50 | 56 |
| 0.0100 | 0.0012 | 8:1 | | | 60 | 68 |

TABLE 17

Fungicidal activity of a composition of Aureobasidin A and 1-(4,5-dimethylbenzimidazol-1-yl)-4,4-difluoro-3,3-dimethyl-isoquinoline (B-9) against *Alternaria solani* as described in Example 1-2 above.

| Aureobasidin A (A) (ppm) | (B-9) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0100 | | | 14 | | | |
| | 0.0012 | | | 24 | | |
| 0.0100 | 0.0012 | 8:1 | | | 35 | 42 |

TABLE 18

Fungicidal activity of a composition of Aureobasidin A and 6-chloro-4,4-difluoro-3,3-dimethyl-1-(4-methylbenzimidazol-1-yl)isoquinoline (B-10) against *Botrytis cinerea* as described in Example 1-1 above.

| Aureobasidin A (A) (ppm) | (B-10) (ppm) | Ratio compound (A):(B) | (A) inhibition (%) | (B) inhibition (%) | Expected (additive) activity (Colby) (%) | Combined inhibition (observed) (%) |
|---|---|---|---|---|---|---|
| 0.0050 | | | 17 | | | |
| 0.0100 | | | 17 | | | |
| 0.0200 | | | 32 | | | |
| | 0.0006 | | | 21 | | |
| | 0.0012 | | | 39 | | |
| | 0.0025 | | | 49 | | |
| 0.0050 | 0.0006 | 1:1 | | | 34 | 50 |
| 0.0100 | 0.0012 | 1:1 | | | 49 | 59 |
| 0.0200 | 0.0025 | 1:1 | | | 66 | 73 |

The invention claimed is:

1. A fungicidal composition comprising a mixture of components (A) and (B) as active ingredients, wherein component (A) comprises a cyclic depsipeptide of formula (I-A1) or a stereoisomer thereof:

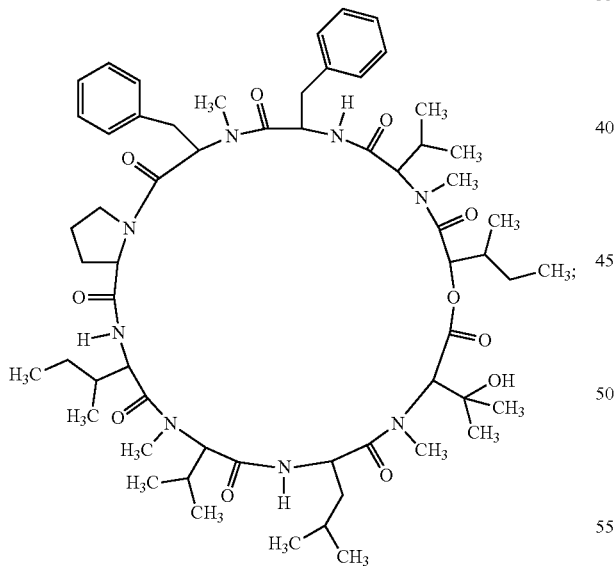

(I-A1)

and component (B) is selected from the group consisting of quinofumelin, ipflufenoquin, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-1,3-dimethyl-butyl]-7,8-difluoro-quinoline-3-carboxamide, N-[(1S)-1-benzyl-1,3-dimethyl-butyl]-7,8-difluoro-quinoline-3-carboxamide, 8-fluoro-N-[(1R)-1-[(3-fluorophenyl)methyl]-1,3-dimethyl-butyl]quinoline-3-carboxamide, 8-fluoro-N-[(1S)-1-[(3-fluorophenyl)methyl]-1,3-dimethyl-butyl]quinoline-3-carboxamide, N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(6-methylpyrazolo[1,5-a]pyridin-3-yl)isoquinoline, 4,4-difluoro-3,3-dimethyl-1-(7-methylpyrazolo[1,5-a]pyridin-3-yl)isoquinoline, 1-(6-chloro-7-methyl-pyrazolo[1,5-a]pyridin-3-yl)-4,4-difluoro-3,3-dimethyl-isoquinoline, 1-(4,5-dimethyl-benzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, 4,4-difluoro-1-(5-fluoro-4-methyl-benzimidazol-1-yl)-3,3-dimethyl-isoquinoline, 3-(4,4-difluoro-3,3-dimethyl-1-isoquinolyl)-7,8-dihydro-6H-cyclopenta[e]benzimidazole, 1-(5,6-dimethyl-3-pyridyl)-4,4-difluoro-3,3-dimethyl-isoquinoline, 1-[6-(difluoromethyl)-5-methyl-3-pyridyl]-4,4-difluoro-3,3-dimethyl-isoquinoline, N-[2-(2-ethylpyrazol-3-yl)phenyl]-5,6-difluoro-3-methyl-quinoxalin-2-amine, 5,6-difluoro-N-[3-fluoro-2-(2-propylpyrazol-3-yl)phenyl]-3-methyl-quinoxalin-2-amine and 3-[[3-chloro-2-(2-ethylpyrazol-3-yl)phenyl]methyl]-7,8-difluoro-2-methyl-quinoline.

2. The composition according to claim 1, wherein the weight ratio of (A) to (B) is from 100:1 to 1:1000.

3. The composition according to claim 1, wherein component (A) further comprises one or more other cyclic depsipeptides of formula (I-A) or stereoisomers thereof:

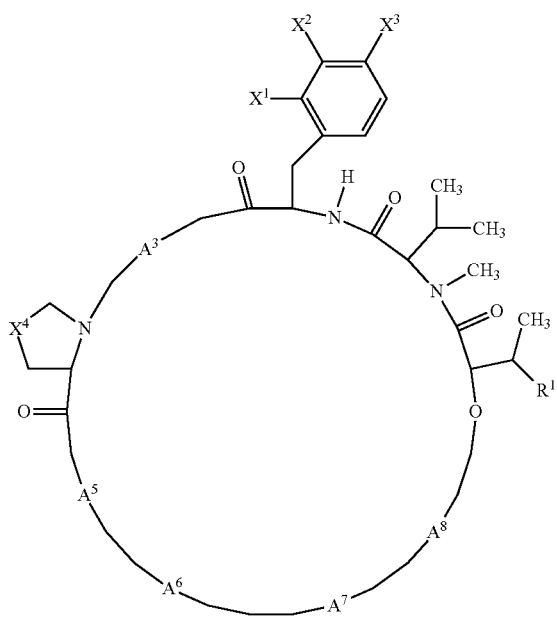

(I-A)

wherein

R¹ is methyl or ethyl;

each of X¹, X² and X³ is hydrogen, or X¹, X² and X³ are hydrogen, fluorine or hydroxyl, with the proviso that only one of X¹, X² and X³ is fluorine or hydroxyl;

X⁴ is CH₂, S or hydroxymethylene;

A³ is an α-amino acid residue selected from the group consisting of N-methyl-L-phenylalanine (L-MePhe), L-phenylalanine (L-Phe), β-hydroxy-N-methyl-L-phenylalanine (L-β-OH-MePhe), ortho-fluoro-N-methyl-L-phenylalanine (L-o-F-MePhe), meta-fluoro-N-methyl-L-phenylalanine (L-m-F-MePhe), para-fluoro-N-methyl-L-phenylalanine (L-p-F-MePhe), meta-bromo-N-methyl-L-phenylalanine (L-m-Br-MePhe), para-bromo-N-methyl-L-phenylalanine (L-p-Br-MePhe), meta-iodo-N-methyl-L-phenylalanine (L-m-I-MePhe), para-iodo-N-methyl-L-phenylalanine (L-p-I-MePhe), 3-phenyl-N-methyl-L-phenylalanine, 4-phenyl-N-methyl-L-phenylalanine, 3-(4-fluorophenyl)-N-methyl-L-phenylalanine, 4-(4-fluorophenyl)-N-methyl-L-phenylalanine, 3-(4-pyridinyl)-N-methyl-L-phenylalanine, 4-(4-pyridinyl)-N-methyl-L-phenylalanine, 3-(1-pyridinyl)-N-methyl-L-phenylalanine, 4-(1-pyridinyl)-N-methyl-L-phenylalanine, 4-(2-chloro-4-pyridinyl)-N-methyl-L-phenylalanine, 3-(2-chloro-5-pyridinyl)-N-methyl-L-phenylalanine, 4-(2-chloro-5-pyridinyl)-N-methyl-L-phenylalanine, 3-[4-(piperazin-1-yl)phenyl]phenyl-N-methyl-L-phenylalanine, 4-[4-(piperazin-1-yl)phen-1-yl]phenyl-N-methyl-L-phenylalanine, 3-[4-(4-methylpiperazin-1-yl)phenyl]phenyl-N-methyl-L-phenylalanine, 4-[4-(4-methylpiperazin-1-yl)phen-1-yl]phenyl-N-methyl-L-phenylalanine, β-oxo-N-methyl-L-phenylalanine (L-β-oxo-MePhe), β-acetoxy-N-methyl-L-phenylalanine (L-β-AcO-MePhe), N-methyl-L-tyrosine (L-MeTyr), O-methyl-N-methyl-L-tyrosine [L-MeTyr(Me)], N-methyl-L-alanine (L-MeAla), N-methyl-L-serine (L-MeSer), N-methyl-D-phenylalanine (D-MePhe), N-methyl-D-alanine (D-MeAla), N-methyl-D-valine (D-MeVal), N-methyl-D-serine (D-MeSer) and N-methyl-L-serine (L-MeSer) residues;

A⁵ is an α-amino acid residue selected from the group consisting of L-allo-isoleucine (L-AIle), L-leucine (L-Leu), L-norleucine (L-Nle), L-norvaline (L-Nva) and L-valine (L-Val) residues;

A⁶ is an α-amino acid residue selected from the group consisting of N-methyl-L-valine (L-MeVal), N-methyl-L-leucine (L-MeLeu), N-methyl-L-allo-isoleucine (L-MeAIle) and L-valine (L-Val) residues;

A⁷ is an α-amino acid residue selected from the group consisting of L-leucine (L-Leu), L-allo-isoleucine (L-AIle) and L-norvaline (L-Nva) residues; and A⁸ is an α-amino acid residue selected from the group consisting of β-hydroxy-N-methyl-L-valine (L-β-OH-MeVal), γ-hydroxy-N-methyl-L-valine (L-γ-OH-MeVal), N-methyl-L-valine (L-MeVal), L-valine (L-Val), N-methyl-2,3-didehydro-L-valine (L-MeDH₂,₃Val), N-methyl-3,4-didehydro-L-valine (L-MeDH₃,₄Val), N-methyl-L-phenylalanine (L-MePhe), β-hydroxy-N-methyl-L-phenylalanine (L-β-OH-MePhe), N-methyl-L-threonine (L-MeThr), sarcosine (Sar) and N,β-dimethyl-L-aspartic acid (L-N,β-MeAsp) residues.

4. The composition according to claim 1, wherein component (A) further comprises a stereoisomer thereof selected from the group consisting of Aureobasidin E and Aureobasidin G.

5. The composition according to claim 3, wherein component (A) comprises:
from 10% to 99.9% by weight of a cyclic depsipeptide of formula (I-A¹) or a stereoisomer thereof, and
from 0.1% to 90% by weight one or more other cyclic depsipeptides of formula (I-A) or stereoisomers thereof.

6. The composition according to claim 1, further comprising an agriculturally acceptable carrier and/or formulation adjuvant, and optionally, a surfactant.

7. A method of controlling or preventing phytopathogenic disease on useful plants or on propagation material thereof, which comprises applying to the useful plants, the locus thereof or propagation material thereof a composition as defined in claim 1.

8. The method according to claim 7, wherein the component (A) is applied at a rate of from 25 g/ha to 500 g/ha in association with 10 g/ha to 500 g/ha of component (B).

9. The method according to claim 7, wherein the phytopathogenic disease is selected from at least one of the group consisting of *Alternaria, Botrytis, Cercospora, Colletotrichum, Corynespora, Guignardia, Mycosphaerella, Monilinia, Penicillium, Phakopsora, Phomopsis, Podosphaera, Pseudopezicula, Septoria, Uncinula* and *Venturia*.

10. The method according to claim 7, wherein the useful plant is selected from grains, fruits and tree nuts, vegetables, field crops, oil seed crops, forage crops, forest plants, horticulture crops, floriculture, greenhouse and nursery plants, propagative materials, culinary herbs and spices, and medicinal herbs.

11. The method according to claim 7, wherein the useful plant is selected from the group consisting of wheat, barley, rice, soybean, apples, almonds, cherries, raspberries, grapes, cucumbers, peanuts, tomatoes, strawberries, citrus and bananas.

12. The method according to claim 7, wherein the components (A) and (B) are applied in a sequential manner.

13. The composition according to claim 1, wherein components (A) and (B) are the only active ingredients.

14. The composition according to claim 1, wherein component (B) is quinofumelin.

15. The composition according to claim 1, wherein component (B) is N-[(1R)-1-benzyl-1,3-dimethyl-butyl]-8-fluoro-quinoline-3-carboxamide, N-[(1S)-1-benzyl-1,3-dimethyl-butyl]-8-fluoro-quinoline-3-carboxamide, N-[(1R)-1-benzyl-3,3,3-trifluoro-1-methyl-propyl]-8-fluoro-quinoline-3-carboxamide, N-[(1S)-1-benzyl-3,3,3-trifluoro-1-methyl-propyl]-8-fluoro-quinoline-3-carboxamide, N-[(1R)-1-benzyl-3-chloro-1-methyl-but-3-enyl]-8-fluoro-quinoline-3-carboxamide, N-[(1S)-1-benzyl-3-chloro-1-methyl-but-3-enyl]-8-fluoro-quinoline-3-carboxamide, 1-(6,7-dimethylpyrazolo[1,5-a]pyridin-3-yl)-4,4,5-trifluoro-3,3-dimethyl-isoquinoline, 1-(6,7-dimethylpyrazolo[1,5-a]pyridin-3-yl)-4,4,6-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, or 6-chloro-4,4-difluoro-3,3-dimethyl-1-(4-methylbenzimidazol-1-yl)isoquinoline.

16. The composition according to claim 1, wherein the weight ratio of component (A) and (B) is synergistic as calculated by the Colby formula.

17. The composition according to claim 1, wherein the weight ratio of component (A) and (B) is from 50:1 to 1:200.

18. The composition according to claim 1, wherein the weight ratio of component (A) and (B) is from 50:1 to 1:20.

\* \* \* \* \*